(12) United States Patent
Moldvai et al.

(10) Patent No.: US 11,914,554 B2
(45) Date of Patent: *Feb. 27, 2024

(54) ADAPTABLE MULTI-LAYERED STORAGE FOR DEDUPLICATING ELECTRONIC MESSAGES

(71) Applicant: Rubrik, Inc., Palo Alto, CA (US)

(72) Inventors: Noel Moldvai, San Francisco, CA (US); Jihang Lim, Mountain View, CA (US)

(73) Assignee: Rubrik, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/103,373

(22) Filed: Jan. 30, 2023

(65) Prior Publication Data

US 2023/0177012 A1 Jun. 8, 2023

Related U.S. Application Data

(63) Continuation of application No. 17/370,290, filed on Jul. 8, 2021, now Pat. No. 11,675,741, which is a (Continued)

(51) Int. Cl.
*H04L 12/00* (2006.01)
*G06F 16/174* (2019.01)
(Continued)

(52) U.S. Cl.
CPC ........ *G06F 16/1748* (2019.01); *G06F 16/137* (2019.01); *H04L 51/08* (2013.01); *H04L 51/42* (2022.05); *H04L 67/1097* (2013.01)

(58) Field of Classification Search
CPC .. G06F 16/1748; G06F 16/137; G06F 16/128; G06F 16/188; H04L 51/08; H04L 51/42; H04L 67/1092; H04L 67/62
(Continued)

(56) References Cited

U.S. PATENT DOCUMENTS 7,529,782 B2   5/2009  Prahlad et al.
8,046,547 B1  10/2011  Chatterjee et al.
(Continued)

FOREIGN PATENT DOCUMENTS

CA         2838107 A1     1/2011

*Primary Examiner* — Frantz Coby
(74) *Attorney, Agent, or Firm* — Holland & Hart LLP

(57) ABSTRACT

Methods and systems for improving data back-up, recovery, and search across different cloud-based applications, services, and platforms are described. A data management and storage system may direct compute and storage resources within a customer's cloud-based data storage account to back-up and restore data while the customer retains full control of their data. The data management and storage system may direct the compute and storage resources within the customer's cloud-based data storage account to generate and store secondary layers that are used for generating search indexes, to generate and store shared space layers and user specific layers to facilitate the deduplication of email attachments and text blocks, to perform a controlled restoration of email snapshots such that sensitive information (e.g., restricted keywords) located within stored snapshots remains protected, and to detect and preserve emails that were received or transmitted and then deleted between two consecutive snapshots.

20 Claims, 23 Drawing Sheets

Related U.S. Application Data continuation of application No. 16/456,983, filed on Jun. 28, 2019, now Pat. No. 11,157,451.

(51) Int. Cl.
*G06F 16/13* (2019.01)
*H04L 51/08* (2022.01)
*H04L 51/42* (2022.01)
*H04L 67/1097* (2022.01)

(58) Field of Classification Search
USPC .......................................... 707/692; 709/201
See application file for complete search history.

(56) References Cited

U.S. PATENT DOCUMENTS

| | | | |
|---|---|---|---|
| 8,255,731 B1 | 8/2012 | Aisina et al. | |
| 9,020,900 B2 | 4/2015 | Vijayan Retnamma et al. | |
| 9,274,714 B2 | 3/2016 | Kamila et al. | |
| 9,959,420 B2 | 5/2018 | Kiang et al. | |
| 10,275,317 B2 | 4/2019 | Borate et al. | |
| 10,339,016 B2 | 7/2019 | Juniwal et al. | |
| 10,423,503 B2 | 9/2019 | Juniwal et al. | |
| 10,891,069 B2 | 1/2021 | Ashraf et al. | |
| 10,999,368 B2 | 5/2021 | Vallabhaneni et al. | |
| 11,030,062 B2 | 6/2021 | Juniwal et al. | |
| 11,080,142 B2 | 8/2021 | Lim et al. | |
| 11,157,451 B2 * | 10/2021 | Moldvai ................ G06F 16/137 | |
| 11,194,669 B2 | 12/2021 | Ekram et al. | |
| 11,308,035 B2 | 4/2022 | Prahlad et al. | |
| 11,392,460 B2 | 7/2022 | Lim et al. | |
| 11,675,741 B2 * | 6/2023 | Moldvai ................ H04L 51/08 | |
| | | | 707/692 |
| 2007/0043705 A1 | 2/2007 | Kaushik et al. | |
| 2010/0106933 A1 | 4/2010 | Kamila et al. | |
| 2011/0246427 A1 | 10/2011 | Modak et al. | |
| 2013/0013572 A1 * | 1/2013 | Tevis ................ G06F 3/0632 | |
| | | | 707/E17.007 |
| 2013/0097306 A1 | 4/2013 | Dhunay | |
| 2013/0262210 A1 | 10/2013 | Savage et al. | |
| 2014/0259190 A1 | 9/2014 | Kiang et al. | |
| 2015/0085604 A1 | 3/2015 | Flanagan | |
| 2015/0127936 A1 | 5/2015 | Kim | |
| 2016/0057027 A1 | 2/2016 | Hinrichs et al. | |
| 2016/0210198 A1 | 7/2016 | Durge et al. | |
| 2017/0090786 A1 | 3/2017 | Parab et al. | |
| 2017/0228387 A1 | 8/2017 | Ahn et al. | |
| 2017/0262350 A1 | 9/2017 | Dornemann | |
| 2017/0286230 A1 | 10/2017 | Zamir | |
| 2018/0060178 A1 | 3/2018 | Barajas Gonzalez et al. | |
| 2018/0095845 A1 | 4/2018 | Sanakkayala et al. | |
| 2018/0232395 A1 | 8/2018 | Deshmukh et al. | |
| 2018/0275881 A1 | 9/2018 | Ashraf et al. | |
| 2019/0050301 A1 | 2/2019 | Juniwal et al. | |
| 2019/0050302 A1 | 2/2019 | Juniwal et al. | |
| 2019/0129972 A1 | 5/2019 | Borate et al. | |
| 2019/0236274 A1 | 8/2019 | Brenner | |
| 2019/0278663 A1 | 9/2019 | Mehta et al. | |
| 2019/0354441 A1 | 11/2019 | Ramachandran et al. | |
| 2019/0370113 A1 | 12/2019 | Zhao et al. | |
| 2019/0384678 A1 | 12/2019 | Samprathi et al. | |
| 2020/0057699 A1 | 2/2020 | Juniwal et al. | |
| 2020/0073647 A1 | 3/2020 | Takabayashi | |
| 2020/0379848 A1 | 12/2020 | Ekram et al. | |
| 2020/0409795 A1 | 12/2020 | Lim et al. | |
| 2020/0409796 A1 | 12/2020 | Terei et al. | |
| 2020/0409802 A1 | 12/2020 | Lim et al. | |
| 2020/0409909 A1 | 12/2020 | Moldvai et al. | |
| 2022/0066995 A1 | 3/2022 | Moldvai et al. | |
| 2023/0273864 A1 | 8/2023 | Terei et al. | |

\* cited by examiner

```
Virtual Machine A, Version V7 {
    pBase,      ⎯⎯→   /snapshots/VM_A/s5/s5.full
    pF1,        ⎯⎯→   /snapshots/VM_A/s6/s6.delta
    pF2         ⎯⎯→   /snapshots/VM_A/s7/s7.delta
}
```

```
Virtual Machine A, Version V2 {
    pBase,      ⎯⎯→   /snapshots/VM_A/s5/s5.full
    pR1,        ⎯⎯→   /snapshots/VM_A/s4/s4.delta
    pR2,        ⎯⎯→   /snapshots/VM_A/s3/s3.delta
    pR3         ⎯⎯→   /snapshots/VM_A/s2/s2.delta
}
```

```
Virtual Machine A, Version V7 {
    pBase2,                    ——▶  /snapshots/VM_A/s7/s7.full
}
```

```
Virtual Machine A, Version V2 {
    pBase2,                    ——▶  /snapshots/VM_A/s7/s7.full
    pR11,                      ——▶  /snapshots/VM_A/s6/s6.delta
    pR12,                      ——▶  /snapshots/VM_A/s5/s5.delta
    pR1,                       ——▶  /snapshots/VM_A/s4/s4.delta
    pR2,                       ——▶  /snapshots/VM_A/s3/s3.delta
    pR3                        ——▶  /snapshots/VM_A/s2/s2.delta
}
```

```
Virtual Machine A, Version VS {
    pBaseA,
    pR4,
}
```

```
Virtual Machine A, Version VU {
    pBaseB,
    pR1,
    pR2,
    pR3
}
```

```
Virtual Machine A, Version VU {
    pBaseA,
    pF9
}
```

US 11,914,554 B2

ADAPTABLE MULTI-LAYERED STORAGE FOR DEDUPLICATING ELECTRONIC MESSAGES

CLAIM OF PRIORITY

This application is a Continuation of U.S. patent application Ser. No. 17/370,290, filed Jul. 8, 2021 and entitled "ADAPTABLE MULTI-LAYERED STORAGE FOR DEDUPLICATING ELECTRONIC MESSAGES", which is a Continuation of U.S. patent application Ser. No. 16/456,983, filed Jun. 28, 2019 and entitled "ADAPTABLE MULTI-LAYERED STORAGE FOR DEDUPLICATING ELECTRONIC MESSAGES", now U.S. Pat. No. 11,157,451, each of which is assigned to the assignee hereof and is hereby incorporated by reference in its entirety.

BACKGROUND

Virtualization allows virtual hardware to be created and decoupled from the underlying physical hardware. For example, a hypervisor running on a host machine or server may be used to create one or more virtual machines that may each run the same operating system or different operating systems (e.g., a first virtual machine may run a Windows® operating system and a second virtual machine may run a Unix-like operating system such as OS X®). A virtual machine may comprise a software implementation of a physical machine. The virtual machine may include one or more virtual hardware devices, such as a virtual processor, a virtual memory, a virtual disk, or a virtual network interface card. The virtual machine may load and execute an operating system and applications from the virtual memory. The operating system and applications executed by the virtual machine may be stored using the virtual disk. The virtual machine may be stored (e.g., using a datastore comprising one or more physical storage devices) as a set of files including a virtual disk file for storing the contents of the virtual disk and a virtual machine configuration file for storing configuration settings for the virtual machine. The configuration settings may include the number of virtual processors (e.g., four virtual CPUs), the size of a virtual memory, and the size of a virtual disk (e.g., a 2 TB virtual disk) for the virtual machine.

DETAILED DESCRIPTION

Figure 1A:
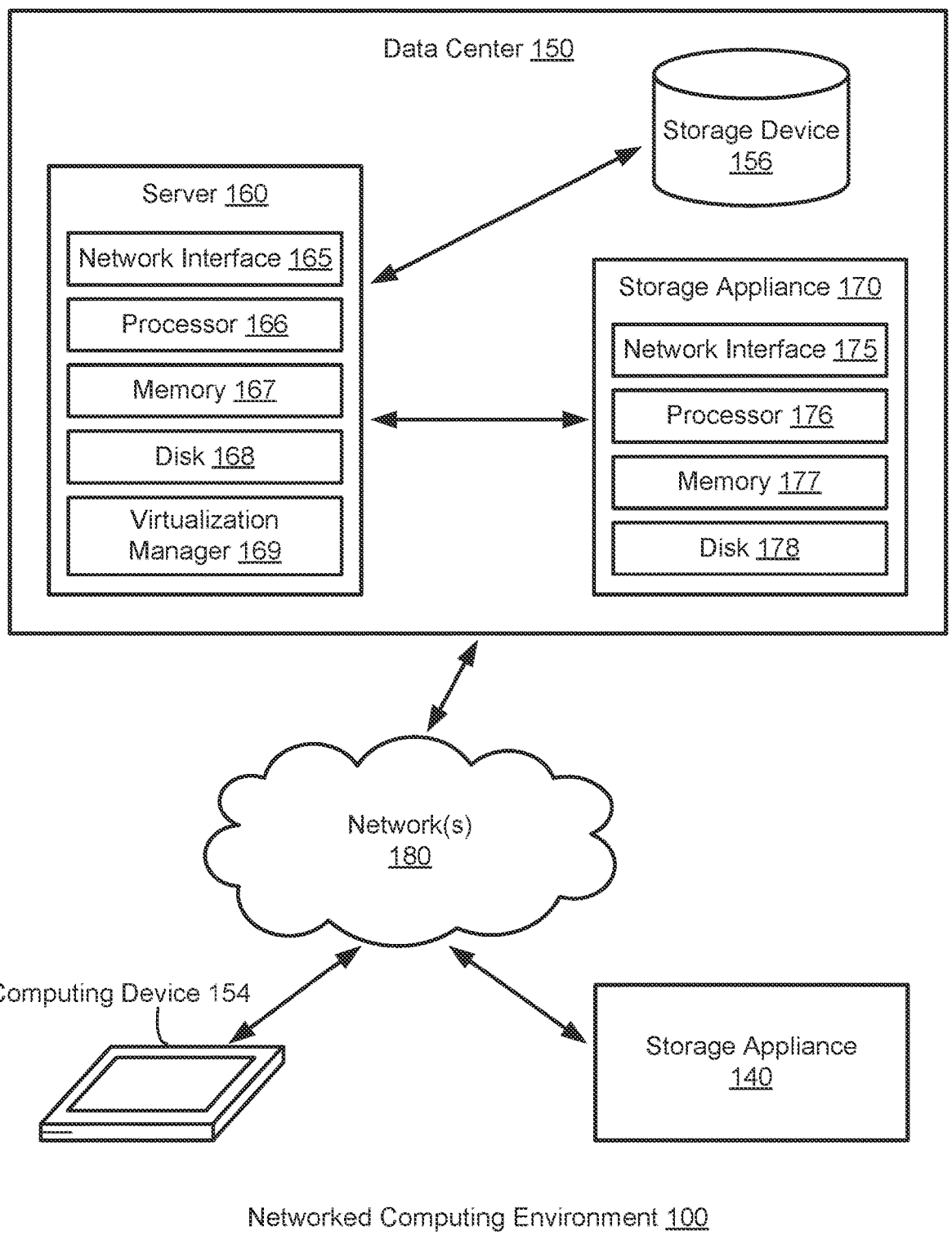
FIG. 1A depicts one embodiment of a networked computing environment.

Technology is described for providing a data management and storage system to backup, archive, recover, and search data across different cloud-based applications, services, and platforms. A cloud-based application, service, or platform may correspond with a cloud-based software-as-a-service (SaaS), which may refer to a software distribution model in which applications are hosted by a service provider and made available to end users over the Internet. The cloud-based application, service, or platform may provide a work productivity application (e.g., a word processing application or a spreadsheet application), a communication application (e.g., an instant messaging application), or a file sharing and synchronization application over the Internet. One technical issue with relying on different cloud-based applications, services, and platforms is that data may be lost due to an end user error (e.g., the end user may accidentally delete valuable data without realizing the mistake until after several weeks have passed) if the native platform on which the end user error occurred does not provide a fine-granularity capability to backup and restore end user data. One technical benefit of providing a data management and storage system to backup end user data across different cloud-based applications, services, and platforms is that the end user data may be protected from data loss via fine-granularity backups (e.g., snapshots of the end user data may be captured and stored on an hourly basis or every five minutes) and the end user data may be recovered quickly in the event of data loss with fine-granularity search and restores. For example, in the event of data loss due to an end user error, the end user may be able to quickly search through different point in time snapshots of an electronic mailbox by email address, date range, and keywords within subject lines in order to select and restore a point in time version of the electronic mailbox, a calendar, or a group of electronic messages. Another technical benefit of providing the data management and storage system is that an aggregated search may be performed across the different cloud-based applications, services, and platforms.

In some embodiments, the data management and storage system may comprise a cloud-based data management application that is in communication with an end user's (or customer's) cloud-based data storage service that is controlled and/or owned by the end user (or customer). The end user may exclusively set or control the data retention policies within their cloud-based data storage service and control the transfer of data from other cloud-based services that are also controlled by the end user to their cloud-based data storage service. In the case of point in time snapshots of data (e.g., snapshots of a user's email mailbox) being captured from the cloud-based service and stored within cloud-based data storage service, the machines and services transferring the snapshot data are all within accounts or services controlled by the end user. In one example, the cloud-based data storage service may comprise a secure cloud-based data storage service (e.g., Azure or S3) and the other cloud-based services may include a cloud-based subscription service (e.g., Office 365) or a cloud-based file service (e.g., OneDrive). The end user may allow the data management and storage system to establish a secure connection with the cloud-based data storage service (e.g., via token-based authentication) and to transfer or create an application with restricted access to compute and storage resources within the cloud-based data storage service. Thereafter, the data management and storage system may then orchestrate or provide limited instructions to the application with restricted access to the compute and storage resources in order to perform data management tasks for the cloud-based data storage service, such as data management tasks to backup, search, or recover data within the cloud-based data storage service.

The data management and storage system in communication with the end user's cloud-based data storage service may comprise a hardware storage appliance that includes hardware data storage nodes or a virtual storage appliance that includes virtual data storage nodes. The data management and storage system may monitor and control compute resources external to the data management and storage system that are within the end user's cloud-based data storage service (e.g., monitoring the amount of compute and storage resources available to generate and store search indexes within the end user's cloud-based data storage account) to back-up the end user's data while the end user retains full control of their data. The data management and storage system may be granted access permissions to access a compute resource group within the end user's cloud-based data storage account to allow the data management and storage system to run applications or application containers using the compute resource group, to adjust the amount of compute and/or storage resources required to run the applications or application containers, and to access blob storage and block storage to store data backups and search indexes for the data backups.

In one embodiment, the amount of memory and compute resources within the end user's cloud-based data storage account may vary over time (e.g., adjusted by the end user in order to reduce storage costs or to take advantage of compute elasticity) and in response the data management and storage system may make adjustments, such as generating smaller-sized secondary layers that are stored and indexed within the end user's cloud-based data storage account. A secondary layer may comprise a portion of a snapshot from which a search index may be generated. In one example, the secondary layer for a snapshot of a plurality of electronic messages (e.g., emails) may comprise extracted portions of the plurality of electronic messages comprising only the subject, sender, and receiver fields for the plurality of electronic messages. The files sizes of the secondary layers and the number of search indexes generated and stored within the end user's cloud-based data storage account may be automatically scaled over time with the amount of memory and compute resources that are available to the data management and storage system within the end user's cloud-based data storage account.

In some embodiments, the data management and storage system may direct the resources within the end user's cloud-based data storage service to generate and store secondary layers that are used for generating search indexes for snapshots stored using the storage resources. In this case, a secondary layer may be generated for each snapshot and include only extracted portions of the snapshot. The snapshots may comprise snapshots of virtual machines, snapshots of real machines, or snapshots of a user's email inbox over time. Generating search indexes for older point in time versions of a user's email inbox may allow the user to search emails that are no longer in their current inbox. In one example, if a snapshot comprises a snapshot of the electronic messages within a user's email inbox at a particular point in time, then the secondary layer may comprise the portions of the electronic messages corresponding with the to, carbon copy, from, and subject fields of each electronic message and the first ten lines of text within the message body of each electronic message. Instead of indexing an entire snapshot, a search index may be generated for just the secondary layer. For the electronic messages within the user's email inbox at the particular point in time, both the complete data corresponding with the point in time snapshot of the user's email inbox, which may be stored as a full or incremental snapshot, and the secondary layer that comprises a subset of the data to be indexed may be stored. The secondary layer may be stored using block storage or file-based storage while the full or incremental snapshot is stored using blob storage. In some cases, the secondary layer may be stored using hot cloud data storage while the full or incremental snapshot is stored using cold cloud data storage. The size of the secondary layer may be adjusted over time based on update frequency, prior user behavior (e.g., which folders, subjects, usernames, and date ranges are frequently searched on), and the availability of storage resources within the customer's data storage account that may change over time. The secondary layers may be deleted to save space or regenerated over time (e.g., a secondary layer may be enlarged if a user starts to heavily search a particular range of dates).

In some embodiments, the data management and storage system may direct the resources within the end user's cloud-based data storage service to generate and store shared space layers and user specific layers to facilitate the deduplication of email attachments and facilitate the controlled restoration of portions of email messages such that sensitive information remains protected and is not restored to unauthorized users. A snapshot of a plurality of electronic messages associated with a user's email mailbox may be stored using a shared space layer that comprises attachments and large blocks of common text and a user specific layer that comprises the user's email with pointers into the shared space layer. If an email (or electronic message) is sent to ten email addresses with a large attachment, then the shared space layer may store a single copy of the large attachment if the disk space for the large attachment is greater than a threshold amount of disk space (e.g., is more than 50 MB) or if the aggregate file size of all of the ten attachments exceeds a threshold file size (e.g., is greater than 200 MB). In some cases, the deduplication of content may only be performed if the shared content is greater than a threshold amount of data (e.g., if an attachment is greater than 20 MB). When an email is received, shared content for large attachments and large blocks of common text may be identified by comparing hashes. The comparing of hash values may allow large attachments to be identified as already existing within the shared space layer even though the attachment may have been renamed. In some cases, both the shared space layer and the user specific layer may have corresponding secondary layers for facilitating search of the plurality of electronic messages associated with the snapshots of the user's email mailbox over time.

In some embodiments, the data management and storage system may direct the resources within the end user's cloud-based data storage service to perform a controlled restoration of email snapshots such that sensitive information located within stored snapshots remains protected. In this case, prior to restoration, attachments and text blocks that include sensitive information or restricted keywords may be identified and stored in the shared space layer. For example, attachments that include a restricted keyword (e.g., a project codename) or portions of text that include the restricted keyword may be identified and stored in the shared space layer. During restoration, user permissions may determine whether the attachments and text blocks that include the sensitive information may be restored for a specific user. Data within the shared space layer may be restored with the sensitive information redacted or modified. In one example, the sensitive information may be replaced with pre-approved text. The sensitive information may be identified after a point in time snapshot has already been created. In this case, the shared space layer and the user specific layer may need to be regenerated to move the sensitive information into the shared space layer. The shared space layer may use stronger encryption than the user specific layer. Furthermore, the data management and storage system may direct the resources within the end user's cloud-based data storage service to perform a controlled search of email snapshots such that any search results do not include the sensitive information.

In some embodiments, the data management and storage system may direct the resources within the end user's cloud-based data storage service to detect and preserve emails that were received or transmitted and then deleted between two consecutive snapshots. The data management and storage system may direct the resources within the end user's cloud-based data storage service to buffer all emails received or transmitted after a point in time snapshot has been captured and then compare the buffered emails with those captured in the subsequent snapshot to identify emails that were received or transmitted and then deleted prior to the subsequent snapshot. In some cases, the emails deleted between the two consecutive snapshots may be stored using a shared space layer (e.g., for attachments or large blocks of text) and a user specific layer. The emails deleted between the two consecutive snapshots may be stored using a buffer snapshot and a secondary layer may be generated for the buffer snapshot to facilitate indexing.

An integrated data management and storage system may be configured to manage the automated storage, backup, deduplication, replication, recovery, and archival of data within and across physical and virtual computing environments. The integrated data management and storage system may provide a unified primary and secondary storage system with built-in data management that may be used as both a backup storage system and a "live" primary storage system for primary workloads. In some cases, the integrated data management and storage system may manage the extraction and storage of historical snapshots associated with different point in time versions of virtual machines and/or real machines (e.g., a hardware server, a laptop, a tablet computer, a smartphone, or a mobile computing device) and provide near instantaneous recovery of a backed-up version of a virtual machine, a real machine, or one or more files residing on the virtual machine or the real machine. The integrated data management and storage system may allow backed-up versions of real or virtual machines to be directly mounted or made accessible to primary workloads in order to enable the near instantaneous recovery of the backed-up versions and allow secondary workloads (e.g., workloads for experimental or analytics purposes) to directly use the integrated data management and storage system as a primary storage target to read or modify past versions of data.

The integrated data management and storage system may include a distributed cluster of storage nodes that presents itself as a unified storage system even though numerous storage nodes may be connected together and the number of connected storage nodes may change over time as storage nodes are added to or removed from the cluster. The integrated data management and storage system may utilize a scale-out node based architecture in which a plurality of data storage appliances comprising one or more nodes are in communication with each other via one or more networks. Each storage node may include two or more different types of storage devices and control circuitry configured to store, deduplicate, compress, and/or encrypt data stored using the two or more different types of storage devices. In one example, a storage node may include two solid-state drives (SSDs), three hard disk drives (HDDs), and one or more processors configured to concurrently read data from and/or write data to the storage devices. The integrated data management and storage system may replicate and distribute versioned data, metadata, and task execution across the distributed cluster to increase tolerance to node and disk failures (e.g., snapshots of a virtual machine may be triply mirrored across the cluster). Data management tasks may be assigned and executed across the distributed cluster in a fault tolerant manner based on the location of data within the cluster (e.g., assigning tasks to nodes that store data related to the task) and node resource availability (e.g., assigning tasks to nodes with sufficient compute or memory capacity for the task).

The integrated data management and storage system may apply a data backup and archiving schedule to backed-up real and virtual machines to enforce various backup service level agreements (SLAs), recovery point objectives (RPOs), recovery time objectives (RTOs), data retention requirements, and other data backup, replication, and archival policies across the entire data lifecycle. For example, the data backup and archiving schedule may require that snapshots of a virtual machine are captured and stored every four hours for the past week, every day for the past six months, and every week for the past five years.

As virtualization technologies are adopted into information technology (IT) infrastructures, there is a growing need for recovery mechanisms to support mission critical application deployment within a virtualized infrastructure. However, a virtualized infrastructure may present a new set of challenges to the traditional methods of data management due to the higher workload consolidation and the need for instant, granular recovery. The benefits of using an integrated data management and storage system include the ability to reduce the amount of data storage required to backup real and virtual machines, the ability to reduce the amount of data storage required to support secondary or non-production workloads, the ability to provide a non-passive storage target in which backup data may be directly accessed and modified, and the ability to quickly restore earlier versions of virtual machines and files stored locally or in the cloud.

FIG. 1A depicts one embodiment of a networked computing environment 100 in which the disclosed technology may be practiced. As depicted, the networked computing environment 100 includes a data center 150, a storage appliance 140, and a computing device 154 in communication with each other via one or more networks 180. The networked computing environment 100 may include a plurality of computing devices interconnected through one or more networks 180. The networked computing environment 100 may correspond with or provide access to a cloud computing environment providing Software-as-a-Service (SaaS) or Infrastructure-as-a-Service (IaaS) services. The one or more networks 180 may allow computing devices and/or storage devices to connect to and communicate with other computing devices and/or other storage devices. In some cases, the networked computing environment may include other computing devices and/or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system. The one or more networks 180 may include a cellular network, a mobile network, a wireless network, a wired network, a secure network such as an enterprise private network, an unsecure network such as a wireless open network, a local area network (LAN), a wide area network (WAN), and the Internet.

The data center 150 may include one or more servers, such as server 160, in communication with one or more storage devices, such as storage device 156. The one or more servers may also be in communication with one or more storage appliances, such as storage appliance 170. The server 160, storage device 156, and storage appliance 170 may be in communication with each other via a networking fabric connecting servers and data storage units within the data center to each other. The server 160 may comprise a production hardware server. The storage appliance 170 may include a data management system for backing up virtual machines, real machines, virtual disks, real disks, and/or electronic files within the data center 150. The server 160 may be used to create and manage one or more virtual machines associated with a virtualized infrastructure. The one or more virtual machines may run various applications, such as a database application or a web server. The storage device 156 may include one or more hardware storage devices for storing data, such as a hard disk drive (HDD), a magnetic tape drive, a solid-state drive (SSD), a storage area network (SAN) storage device, or a networked-attached storage (NAS) device. In some cases, a data center, such as data center 150, may include thousands of servers and/or data storage devices in communication with each other. The data storage devices may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

A server, such as server 160, may allow a client to download information or files (e.g., executable, text, application, audio, image, or video files) from the server or to perform a search query related to particular information stored on the server. In some cases, a server may act as an application server or a file server. In general, a server may refer to a hardware device that acts as the host in a client-server relationship or a software process that shares a resource with or performs work for one or more clients. One embodiment of server 160 includes a network interface 165, processor 166, memory 167, disk 168, and virtualization manager 169 all in communication with each other. Network interface 165 allows server 160 to connect to one or more networks 180. Network interface 165 may include a wireless network interface and/or a wired network interface. Processor 166 allows server 160 to execute computer readable instructions stored in memory 167 in order to perform processes described herein. Processor 166 may include one or more processing units, such as one or more CPUs and/or one or more GPUs. Memory 167 may comprise one or more types of memory (e.g., RAM, SRAM, DRAM, EEPROM, Flash, etc.). Disk 168 may include a hard disk drive and/or a solid-state drive. Memory 167 and disk 168 may comprise hardware storage devices.

The virtualization manager 169 may manage a virtualized infrastructure and perform management operations associated with the virtualized infrastructure. For example, the virtualization manager 169 may manage the provisioning of virtual machines running within the virtualized infrastructure and provide an interface to computing devices interacting with the virtualized infrastructure. The virtualization manager 169 may also perform various virtual machine related tasks, such as cloning virtual machines, creating new virtual machines, monitoring the state of virtual machines, moving virtual machines between physical hosts for load balancing purposes, and facilitating backups of virtual machines.

One embodiment of storage appliance 170 includes a network interface 175, processor 176, memory 177, and disk 178 all in communication with each other. Network interface 175 allows storage appliance 170 to connect to one or more networks 180. Network interface 175 may include a wireless network interface and/or a wired network interface. Processor 176 allows storage appliance 170 to execute computer readable instructions stored in memory 177 in order to perform processes described herein. Processor 176 may include one or more processing units, such as one or more CPUs and/or one or more GPUs. Memory 177 may comprise one or more types of memory (e.g., RAM, SRAM, DRAM, EEPROM, NOR Flash, NAND Flash, etc.). Disk 178 may include a hard disk drive and/or a solid-state drive. Memory 177 and disk 178 may comprise hardware storage devices.

In one embodiment, the storage appliance 170 may include four machines. Each of the four machines may include a multi-core CPU, 64 GB of RAM, a 400 GB SSD, three 4 TB HDDs, and a network interface controller. In this case, the four machines may be in communication with the one or more networks 180 via the four network interface controllers. The four machines may comprise four nodes of a server cluster. The server cluster may comprise a set of physical machines that are connected together via a network. The server cluster may be used for storing data associated with a plurality of virtual machines, such as backup data associated with different point in time versions of one or more virtual machines.

In another embodiment, the storage appliance 170 may comprise a virtual appliance that comprises four virtual machines. Each of the virtual machines in the virtual appliance may have 64 GB of virtual memory, a 12 TB virtual disk, and a virtual network interface controller. In this case, the four virtual machines may be in communication with the one or more networks 180 via the four virtual network interface controllers. The four virtual machines may comprise four nodes of a virtual cluster.

The networked computing environment 100 may provide a cloud computing environment for one or more computing devices. In one embodiment, the networked computing environment 100 may include a virtualized infrastructure that provides software, data processing, and/or data storage services to end users accessing the services via the networked computing environment. In one example, networked computing environment 100 may provide cloud-based work productivity or business related applications to a computing device, such as computing device 154. The computing device 154 may comprise a mobile computing device or a tablet computer. The storage appliance 140 may comprise a cloud-based data management system for backing up virtual machines and/or files within a virtualized infrastructure, such as virtual machines running on server 160 or files stored on server 160.

In some embodiments, the storage appliance 170 may manage the extraction and storage of virtual machine snapshots associated with different point in time versions of one or more virtual machines running within the data center 150. A snapshot of a virtual machine may correspond with a state of the virtual machine at a particular point in time. In some cases, the snapshot may capture the state of various virtual machine settings and the state of one or more virtual disks for the virtual machine. In response to a restore command from the server 160, the storage appliance 170 may restore a point in time version of a virtual machine or restore point in time versions of one or more files located on the virtual machine and transmit the restored data to the server 160. In response to a mount command from the server 160, the storage appliance 170 may allow a point in time version of a virtual machine to be mounted and allow the server 160 to read and/or modify data associated with the point in time version of the virtual machine. To improve storage density, the storage appliance 170 may deduplicate and compress data associated with different versions of a virtual machine and/or deduplicate and compress data associated with different virtual machines. To improve system performance, the storage appliance 170 may first store virtual machine snapshots received from a virtualized environment in a cache, such as a flash-based cache. The cache may also store popular data or frequently accessed data (e.g., based on a history of virtual machine restorations), incremental files associated with commonly restored virtual machine versions, and current day incremental files or incremental files corresponding with snapshots captured within the past 24 hours.

An incremental file may comprise a forward incremental file or a reverse incremental file. A forward incremental file may include a set of data representing changes that have occurred since an earlier point in time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental was captured and any other forward incremental files that were captured subsequent to the last full image and prior to the forward incremental file). A reverse incremental file may include a set of data representing changes from a later point in time snapshot of a virtual machine. To generate a snapshot of the virtual machine corresponding with a reverse incremental file, the reverse incremental file may be combined with a later point in time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 170 may provide a user interface (e.g., a web-based interface or a graphical user interface) that displays virtual machine information, such as identifications of the virtual machines protected and the historical versions or time machine views for each of the virtual machines protected, and allows an end user to search, select, and control virtual machines managed by the storage appliance. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

Figure 1B:
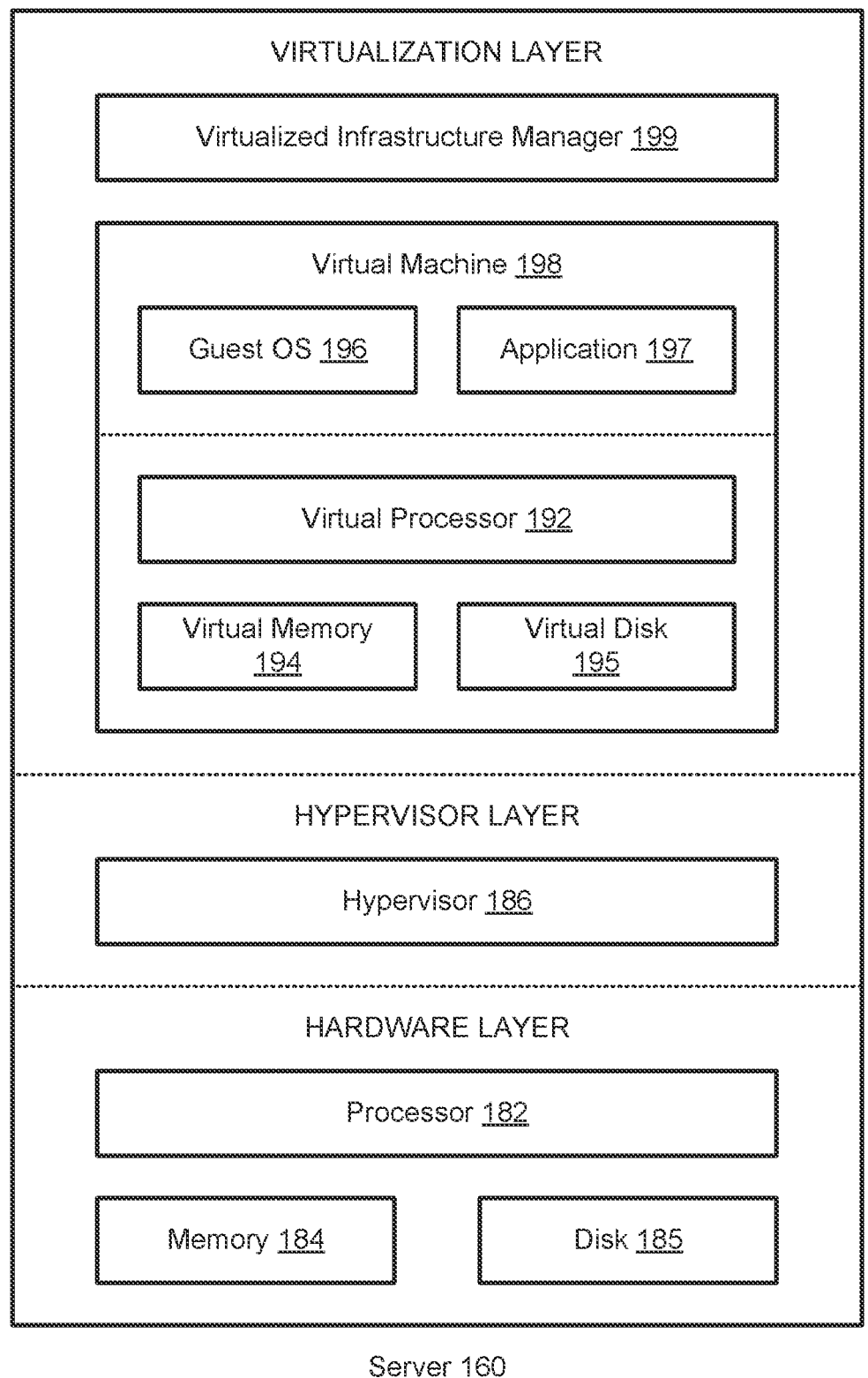
FIG. 1B depicts one embodiment of a server.

FIG. 1B depicts one embodiment of server 160 in FIG. 1A. The server 160 may comprise one server out of a plurality of servers that are networked together within a data center. In one example, the plurality of servers may be positioned within one or more server racks within the data center. As depicted, the server 160 includes hardware-level components and software-level components. The hardware-level components include one or more processors 182, one or more memory 184, and one or more disks 185. The software-level components include a hypervisor 186, a virtualized infrastructure manager 199, and one or more virtual machines, such as virtual machine 198. The hypervisor 186 may comprise a native hypervisor or a hosted hypervisor. The hypervisor 186 may provide a virtual operating platform for running one or more virtual machines, such as virtual machine 198. Virtual machine 198 includes a plurality of virtual hardware devices including a virtual processor 192, a virtual memory 194, and a virtual disk 195. The virtual disk 195 may comprise a file stored within the one or more disks 185. In one example, a virtual machine may include a plurality of virtual disks, with each virtual disk of the plurality of virtual disks associated with a different file stored on the one or more disks 185. Virtual machine 198 may include a guest operating system 196 that runs one or more applications, such as application 197. The virtualized infrastructure manager 199, which may correspond with the virtualization manager 169 in FIG. 1A, may run on a virtual machine or natively on the server 160. The virtualized infrastructure manager 199 may provide a centralized platform for managing a virtualized infrastructure that includes a plurality of virtual machines.

In one embodiment, the server 160 may use the virtualized infrastructure manager 199 to facilitate backups for a plurality of virtual machines (e.g., eight different virtual machines) running on the server 160. Each virtual machine running on the server 160 may run its own guest operating system and its own set of applications. Each virtual machine running on the server 160 may store its own set of files using one or more virtual disks associated with the virtual machine (e.g., each virtual machine may include two virtual disks that are used for storing data associated with the virtual machine).

In one embodiment, a data management application running on a storage appliance, such as storage appliance 140 in FIG. 1A or storage appliance 170 in FIG. 1A, may request a snapshot of a virtual machine running on server 160. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time (e.g., 6:30 p.m. on Jun. 29, 2017) and a second snapshot of the virtual machine may correspond with a second state of the virtual machine at a second point in time subsequent to the first point in time (e.g., 6:30 p.m. on Jun. 30, 2017).

In response to a request for a snapshot of a virtual machine at a particular point in time, the virtualized infrastructure manager 199 may set the virtual machine into a frozen state or store a copy of the virtual machine at the particular point in time. The virtualized infrastructure manager 199 may then transfer data associated with the virtual machine (e.g., an image of the virtual machine or a portion of the image of the virtual machine) to the storage appliance. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 199 may transfer a full image of the virtual machine to the storage appliance or a plurality of data blocks corresponding with the full image (e.g., to enable a full image-level backup of the virtual machine to be stored on the storage appliance). In other cases, the virtualized infrastructure manager 199 may transfer a portion of an image of the virtual machine associated with data that has changed since an earlier point in time prior to the particular point in time or since a last snapshot of the virtual machine was taken. In one example, the virtualized infrastructure manager 199 may transfer only data associated with changed blocks stored on a virtual disk of the virtual machine that have changed since the last snapshot of the virtual machine was taken. In one embodiment, the data management application may specify a first point in time and a second point in time and the virtualized infrastructure manager 199 may output one or more changed data blocks associated with the virtual machine that have been modified between the first point in time and the second point in time.

Figure 1C:
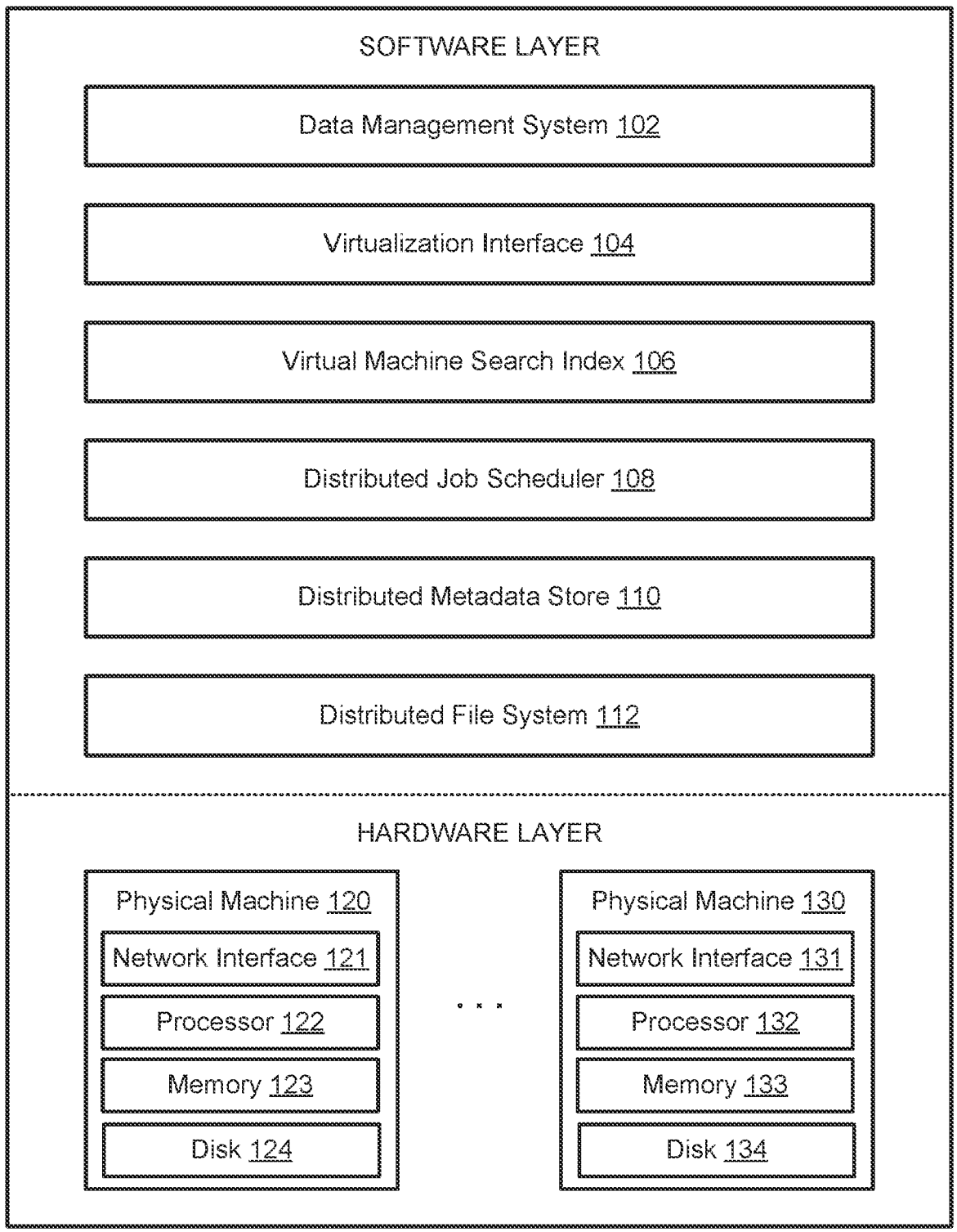
FIG. 1C depicts one embodiment of a storage appliance.

FIG. 1C depicts one embodiment of a storage appliance, such as storage appliance 170 in FIG. 1A. The storage appliance may include a plurality of physical machines that may be grouped together and presented as a single computing system. Each physical machine of the plurality of physical machines may comprise a node in a cluster (e.g., a failover cluster). As depicted, the storage appliance 170 includes hardware-level components and software-level components. The hardware-level components include one or more physical machines, such as physical machine 120 and physical machine 130. The physical machine 120 includes a network interface 121, processor 122, memory 123, and disk 124 all in communication with each other. Processor 122 allows physical machine 120 to execute computer readable instructions stored in memory 123 to perform processes described herein. Disk 124 may include a hard disk drive and/or a solid-state drive. The physical machine 130 includes a network interface 131, processor 132, memory 133, and disk 134 all in communication with each other. Processor 132 allows physical machine 130 to execute computer readable instructions stored in memory 133 to perform processes described herein. Disk 134 may include a hard disk drive and/or a solid-state drive. In some cases, disk 134 may include a flash-based SSD or a hybrid HDD/SSD drive. In one embodiment, the storage appliance 170 may include a plurality of physical machines arranged in a cluster (e.g., eight machines in a cluster). Each of the plurality of physical machines may include a plurality of multi-core CPUs, 128 GB of RAM, a 500 GB SSD, four 4 TB HDDs, and a network interface controller.

As depicted in FIG. 1C, the software-level components of the storage appliance 170 may include data management system 102, a virtualization interface 104, a distributed job scheduler 108, a distributed metadata store 110, a distributed file system 112, and one or more virtual machine search indexes, such as virtual machine search index 106. In one embodiment, the software-level components of the storage appliance 170 may be run using a dedicated hardware-based appliance. In another embodiment, the software-level components of the storage appliance 170 may be run from the cloud (e.g., the software-level components may be installed on a cloud service provider).

In some cases, the data storage across a plurality of nodes in a cluster (e.g., the data storage available from the one or more physical machines) may be aggregated and made available over a single file system namespace (e.g., /snapshots/). A directory for each virtual machine protected using the storage appliance 170 may be created (e.g., the directory for Virtual Machine A may be/snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/s1/ and a second snapshot of Virtual Machine A may reside in /snapshots/VM_A/s2/).

The distributed file system 112 may present itself as a single file system, in which as new physical machines or nodes are added to the storage appliance 170, the cluster may automatically discover the additional nodes and automatically increase the available capacity of the file system for storing files and other data. Each file stored in the distributed file system 112 may be partitioned into one or more chunks. Each of the one or more chunks may be stored within the distributed file system 112 as a separate file. The files stored within the distributed file system 112 may be replicated or mirrored over a plurality of physical machines, thereby creating a load-balanced and fault tolerant distributed file system. In one example, storage appliance 170 may include ten physical machines arranged as a failover cluster and a first file corresponding with a full-image snapshot of a virtual machine (e.g., /snapshots/VM_A/s1/s1.full) may be replicated and stored on three of the ten machines. In some cases, the data chunks associated with a file stored in the distributed file system 112 may include replicated data (e.g., due to n-way mirroring) or parity data (e.g., due to erasure coding). When a disk storing one of the data chunks fails, then the distributed file system may regenerate the lost data and store the lost data using a new disk.

In one embodiment, the distributed file system 112 may be used to store a set of versioned files corresponding with a virtual machine. The set of versioned files may include a first file comprising a full image of the virtual machine at a first point in time and a second file comprising an incremental file relative to the full image. The set of versioned files may correspond with a snapshot chain for the virtual machine. The distributed file system 112 may determine a first set of data chunks that includes redundant information for the first file (e.g., via application of erasure code techniques) and store the first set of data chunks across a plurality of nodes within a cluster. The placement of the first set of data chunks within the cluster may be determined based on the locations of other data related to the first set of data chunks (e.g., the locations of other chunks corresponding with the second file or other files within the snapshot chain for the virtual machine). In some embodiments, the distributed file system 112 may also co-locate data chunks or replicas of virtual machines discovered to be similar to each other in order to allow for cross virtual machine deduplication. In this case, the placement of the first set of data chunks may be determined based on the locations of other data corresponding with a different virtual machine that has been determined to be sufficiently similar to the virtual machine.

The distributed metadata store 110 may comprise a distributed database management system that provides high availability without a single point of failure. The distributed metadata store 110 may act as a quick-access database for various components in the software stack of the storage appliance 170 and may store metadata corresponding with stored snapshots using a solid-state storage device, such as a solid-state drive (SSD) or a Flash-based storage device. In one embodiment, the distributed metadata store 110 may comprise a database, such as a distributed document oriented database. The distributed metadata store 110 may be used as a distributed key value storage system. In one example, the distributed metadata store 110 may comprise a distributed NoSQL key value store database. In some cases, the distributed metadata store 110 may include a partitioned row store, in which rows are organized into tables or other collections of related data held within a structured format within the key value store database. A table (or a set of tables) may be used to store metadata information associated with one or more files stored within the distributed file system 112. The metadata information may include the name of a file, a size of the file, file permissions associated with the file, when the file was last modified, and file mapping information associated with an identification of the location of the file stored within a cluster of physical machines. In one embodiment, a new file corresponding with a snapshot of a virtual machine may be stored within the distributed file system 112 and metadata associated with the new file may be stored within the distributed metadata store 110. The distributed metadata store 110 may also be used to store a backup schedule for the virtual machine and a list of snapshots for the virtual machine that are stored using the storage appliance 170.

In some cases, the distributed metadata store 110 may be used to manage one or more versions of a virtual machine. The concepts described herein may also be applicable to managing versions of a real machine or versions of electronic files. Each version of the virtual machine may correspond with a full image snapshot of the virtual machine stored within the distributed file system 112 or an incremental snapshot of the virtual machine (e.g., a forward incremental or reverse incremental) stored within the distributed file system 112. In one embodiment, the one or more versions of the virtual machine may correspond with a plurality of files. The plurality of files may include a single full image snapshot of the virtual machine and one or more incrementals derived from the single full image snapshot. The single full image snapshot of the virtual machine may be stored using a first storage device of a first type (e.g., a HDD) and the one or more incrementals derived from the single full image snapshot may be stored using a second storage device of a second type (e.g., an SSD). In this case, only a single full image needs to be stored and each version of the virtual machine may be generated from the single full image or the single full image combined with a subset of the one or more incrementals. Furthermore, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incrementals. In some cases, a first version of a virtual machine corresponding with a first snapshot of the virtual machine at a first point in time may be generated by concurrently reading a full image for the virtual machine corresponding with a state of the virtual machine prior to the first point in time from the first storage device while reading one or more incrementals from the second storage device different from the first storage device (e.g., reading the full image from a HDD at the same time as reading 64 incrementals from an SSD).

The distributed job scheduler 108 may comprise a distributed fault tolerant job scheduler, in which jobs affected by node failures are recovered and rescheduled to be run on available nodes. In one embodiment, the distributed job scheduler 108 may be fully decentralized and implemented without the existence of a master node. The distributed job scheduler 108 may run job scheduling processes on each node in a cluster or on a plurality of nodes in the cluster and each node may independently determine which tasks to execute. The distributed job scheduler 108 may be used for scheduling backup jobs that acquire and store virtual machine snapshots for one or more virtual machines over time. The distributed job scheduler 108 may follow a backup schedule to backup an entire image of a virtual machine at a particular point in time or one or more virtual disks associated with the virtual machine at the particular point in time.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one embodiment, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The virtualization interface 104 may provide an interface for communicating with a virtualized infrastructure manager managing a virtualized infrastructure, such as the virtualized infrastructure manager 199 in FIG. 1B, and for requesting data associated with virtual machine snapshots from the virtualized infrastructure. The virtualization interface 104 may communicate with the virtualized infrastructure manager using an API for accessing the virtualized infrastructure manager (e.g., to communicate a request for a snapshot of a virtual machine).

The virtual machine search index 106 may include a list of files that have been stored using a virtual machine and a version history for each of the files in the list. Each version of a file may be mapped to the earliest point in time snapshot of the virtual machine that includes the version of the file or to a snapshot of the virtual machine that includes the version of the file (e.g., the latest point in time snapshot of the virtual machine that includes the version of the file). In one example, the virtual machine search index 106 may be used to identify a version of the virtual machine that includes a particular version of a file (e.g., a particular version of a database, a spreadsheet, or a word processing document). In some cases, each of the virtual machines that are backed up or protected using storage appliance 170 may have a corresponding virtual machine search index.

The data management system 102 may comprise an application running on the storage appliance that manages the capturing, storing, deduplication, compression (e.g., using a lossless data compression algorithm such as LZ4 or LZ77), and encryption (e.g., using a symmetric key algorithm such as Triple DES or AES-256) of data for the storage appliance 170. In one example, the data management system 102 may comprise a highest level layer in an integrated software stack running on the storage appliance. The integrated software stack may include the data management system 102, the virtualization interface 104, the distributed job scheduler 108, the distributed metadata store 110, and the distributed file system 112. In some cases, the integrated software stack may run on other computing devices, such as a server or computing device 154 in FIG. 1A. The data management system 102 may use the virtualization interface 104, the distributed job scheduler 108, the distributed metadata store 110, and the distributed file system 112 to manage and store one or more snapshots of a virtual machine. Each snapshot of the virtual machine may correspond with a point in time version of the virtual machine. The data management system 102 may generate and manage a list of versions for the virtual machine. Each version of the virtual machine may map to or reference one or more chunks and/or one or more files stored within the distributed file system 112. Combined together, the one or more chunks and/or the one or more files stored within the distributed file system 112 may comprise a full image of the version of the virtual machine.

In some embodiments, a plurality of versions of a virtual machine may be stored as a base file associated with a complete image of the virtual machine at a particular point in time and one or more incremental files associated with forward and/or reverse incremental changes derived from the base file. The data management system 102 may patch together the base file and the one or more incremental files in order to generate a particular version of the plurality of versions by adding and/or subtracting data associated with the one or more incremental files from the base file or intermediary files derived from the base file. In some embodiments, each version of the plurality of versions of a virtual machine may correspond with a merged file. A merged file may include pointers or references to one or more files and/or one or more chunks associated with a particular version of a virtual machine. In one example, a merged file may include a first pointer or symbolic link to a base file and a second pointer or symbolic link to an incremental file associated with the particular version of the virtual machine. In some embodiments, the one or more incremental files may correspond with forward incrementals (e.g., positive deltas), reverse incrementals (e.g., negative deltas), or a combination of both forward incrementals and reverse incrementals.

Figure 1D:
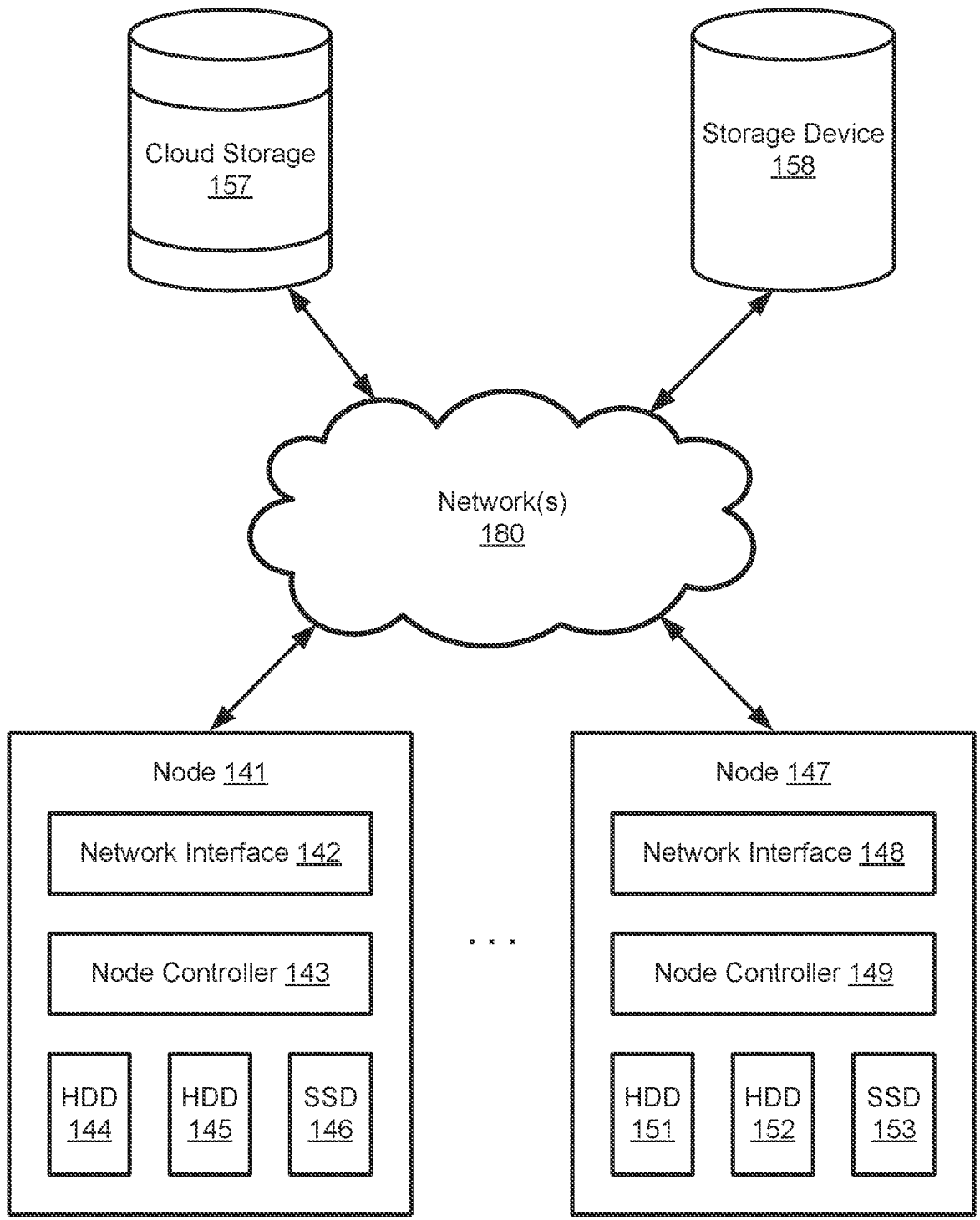
FIG. 1D depicts one embodiment of a portion of an integrated data management and storage system that includes a plurality of nodes in communication with each other and one or more storage devices.

FIG. 1D depicts one embodiment of a portion of an integrated data management and storage system that includes a plurality of nodes in communication with each other and one or more storage devices via one or more networks 180. The plurality of nodes may be networked together and present themselves as a unified storage system. The plurality of nodes includes node 141 and node 147. The one or more storage devices include storage device 157 and storage device 158. Storage device 157 may correspond with a cloud-based storage (e.g., private or public cloud storage). Storage device 158 may comprise a hard disk drive (HDD), a magnetic tape drive, a solid-state drive (SSD), a storage area network (SAN) storage device, or a networked-attached storage (NAS) device. The integrated data management and storage system may comprise a distributed cluster of storage appliances in which each of the storage appliances includes one or more nodes. In one embodiment, node 141 and node 147 may comprise two nodes housed within a first storage appliance, such as storage appliance 170 in FIG. 1C. In another embodiment, node 141 may comprise a first node housed within a first storage appliance and node 147 may comprise a second node housed within a second storage appliance different from the first storage appliance. The first storage appliance and the second storage appliance may be located within a data center, such as data center 150 in FIG. 1A, or located within different data centers.

As depicted, node 141 includes a network interface 142, a node controller 143, and a first plurality of storage devices including HDDs 144-145 and SSD 146. The first plurality of storage devices may comprise two or more different types of storage devices. The node controller 143 may comprise one or more processors configured to store, deduplicate, compress, and/or encrypt data stored within the first plurality of storage devices. Node 147 includes a network interface 148, a node controller 149, and a second plurality of storage devices including HDDs 151-152 and SSD 153. The second plurality of storage devices may comprise two or more different types of storage devices. The node controller 149 may comprise one or more processors configured to store, deduplicate, compress, and/or encrypt data stored within the second plurality of storage devices. In some cases, node 141 may correspond with physical machine 120 in FIG. 1C and node 147 may correspond with physical machine 130 in FIG. 1C.

FIGS. 2A-2K depict various embodiments of sets of files and data structures (e.g., implemented using merged files) associated with managing and storing snapshots of virtual machines. Although various embodiments may be described in reference to the management of virtual machine snapshots, the concepts may be applied to the management of other data snapshots as well, such as snapshots of databases, filesets (e.g., Network Attached Storage filesets), and sets of electronic files.

Figures 2A, 2B, 2C:
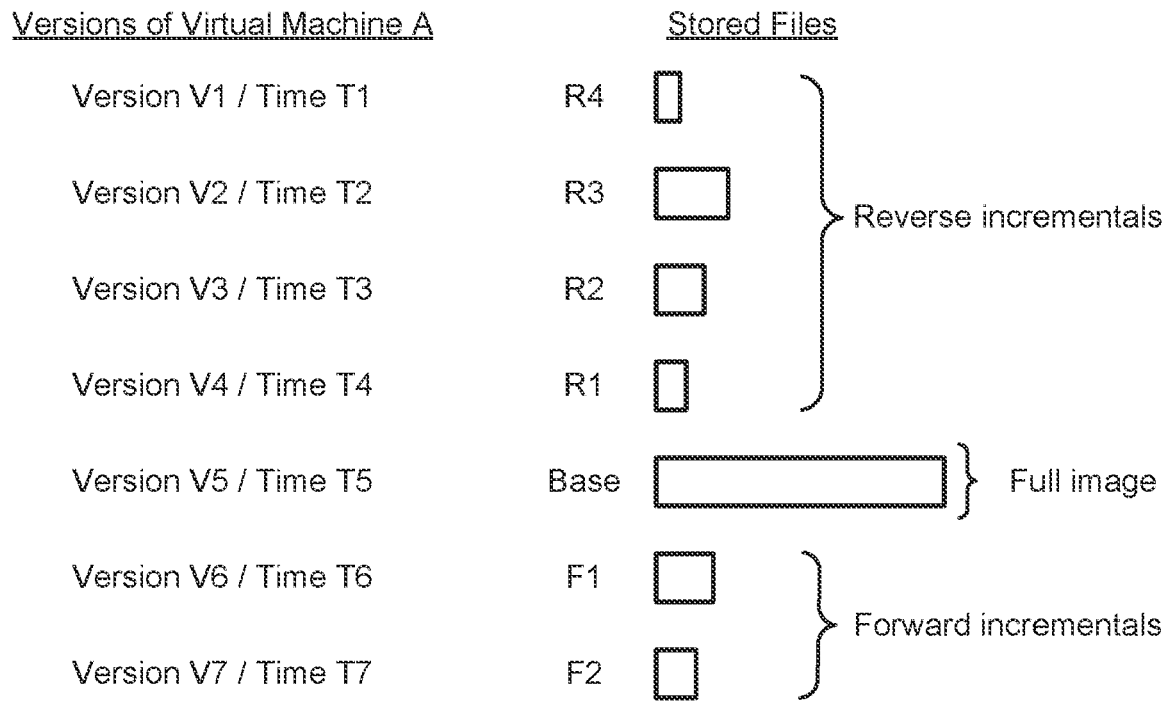
FIGS. 2A-2K depict various embodiments of sets of files and data structures associated with managing and storing snapshots of virtual machines.

FIG. 2A depicts one embodiment of a set of virtual machine snapshots stored as a first set of files. The first set of files may be stored using a distributed file system, such as distributed file system 112 in FIG. 1C. As depicted, the first set of files includes a set of reverse incrementals (R1-R4), a full image (Base), and a set of forward incrementals (F1-F2). The set of virtual machine snapshots includes different versions of a virtual machine (versions V1-V7 of Virtual Machine A) captured at different points in time (times T1-T7). In some cases, the file size of the reverse incremental R3 and the file size of the forward incremental F2 may both be less than the file size of the base image corresponding with version V5 of Virtual Machine A. The base image corresponding with version V5 of Virtual Machine A may comprise a full image of Virtual Machine A at point in time T5. The base image may include a virtual disk file for Virtual Machine A at point in time T5. The reverse incremental R3 corresponds with version V2 of Virtual Machine A and the forward incremental F2 corresponds with version V7 of Virtual Machine A. The forward incremental F1 may be associated with the data changes that occurred to Virtual Machine A between time T5 and time T6 and may comprise one or more changed data blocks.

In some embodiments, each snapshot of the set of virtual machine snapshots may be stored within a storage appliance, such as storage appliance 170 in FIG. 1A. In other embodiments, a first set of the set of virtual machine snapshots may be stored within a first storage appliance and a second set of the set of virtual machine snapshots may be stored within a second storage appliance, such as storage appliance 140 in FIG. 1A. In this case, a data management system may extend across both the first storage appliance and the second storage appliance. In one example, the first set of the set of virtual machine snapshots may be stored within a local cluster repository (e.g., recent snapshots of the file may be located within a first data center) and the second set of the set of virtual machine snapshots may be stored within a remote cluster repository (e.g., older snapshots or archived snapshots of the file may be located within a second data center) or a cloud repository.

FIG. 2B depicts one embodiment of a merged file for generating version V7 of Virtual Machine A using the first set of files depicted in FIG. 2A. The merged file includes a first pointer (pBase) that references the base image Base (e.g., via the path /snapshots/VM_A/s5/s5.full), a second pointer (pF1) that references the forward incremental F1 (e.g., via the path /snapshots/VM_A/s6/s6.delta), and a third pointer (pF2) that references the forward incremental F2 (e.g., via the path /snapshots/VM_A/s7/s7.delta). In one embodiment, to generate the full image of version V7 of Virtual Machine A, the base image may be acquired, the data changes associated with forward incremental F1 may be applied to (or patched to) the base image to generate an intermediate image, and then the data changes associated with forward incremental F2 may be applied to the intermediate image to generate the full image of version V7 of Virtual Machine A.

FIG. 2C depicts one embodiment of a merged file for generating version V2 of Virtual Machine A using the first set of files depicted in FIG. 2A. The merged file includes a first pointer (pBase) that references the base image Base (e.g., via the path /snapshots/VM_A/s5/s5.full), a second pointer (pR1) that references the reverse incremental R1 (e.g., via the path /snapshots/VM_A/s4/s4.delta), a third pointer (pR2) that references the reverse incremental R2 (e.g., via the path /snapshots/VM_A/s3/s3.delta), and a fourth pointer (pR3) that references the reverse incremental R3 (e.g., via the path /snapshots/VM_A/s2/s2.delta). In one embodiment, to generate the full image of version V2 of Virtual Machine A, the base image may be acquired, the data changes associated with reverse incremental R1 may be applied to the base image to generate a first intermediate image, the data changes associated with reverse incremental R2 may be applied to the first intermediate image to generate a second intermediate image, and then the data changes associated with reverse incremental R3 may be applied to the second intermediate image to generate the full image of version V2 of Virtual Machine A.

Figures 2D, 2E, 2F:
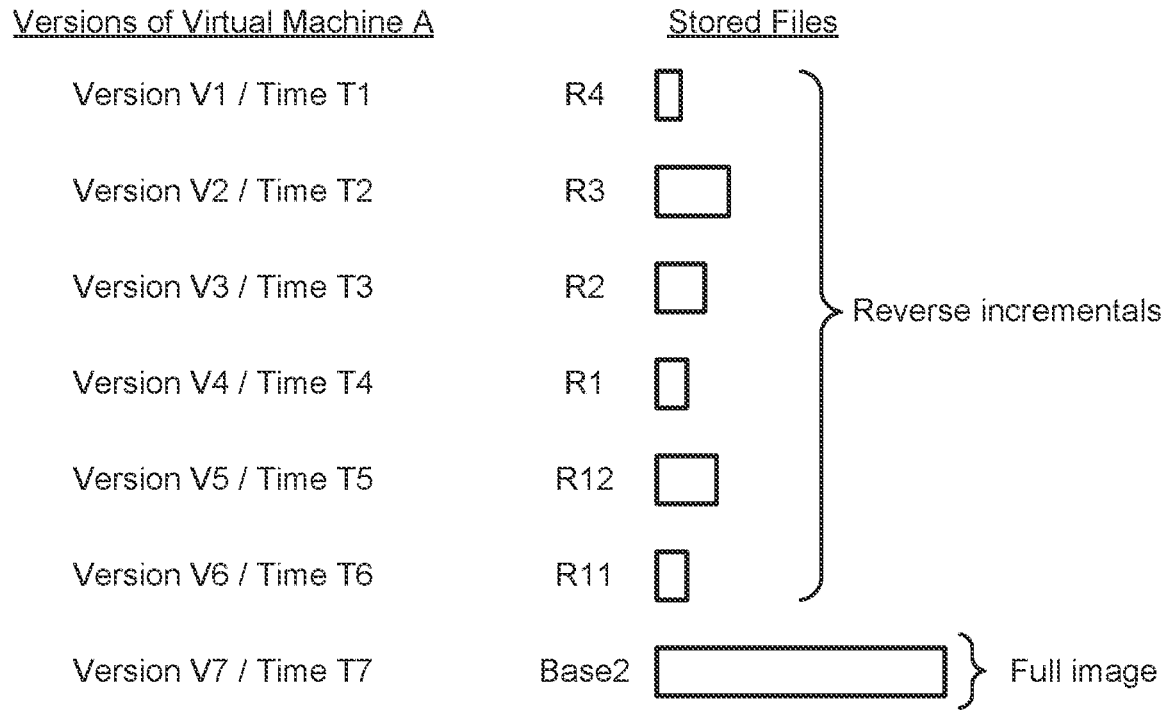

FIG. 2D depicts one embodiment of a set of virtual machine snapshots stored as a second set of files after a rebasing process has been performed using the first set of files in FIG. 2A. The second set of files may be stored using a distributed file system, such as distributed file system 112 in FIG. 1C. The rebasing process may generate new files R12, R11, and Base2 associated with versions V5-V7 of Virtual Machine A in order to move a full image closer to a more recent version of Virtual Machine A and to improve the reconstruction time for the more recent versions of Virtual Machine A. The data associated with the full image Base in FIG. 2A may be equivalent to the new file R12 patched over R11 and the full image Base2. Similarly, the data associated with the full image Base2 may be equivalent to the forward incremental F2 in FIG. 2A patched over F1 and the full image Base in FIG. 2A.

The process of moving the full image snapshot for the set of virtual machine snapshots to correspond with the most recent snapshot version may be performed in order to shorten or reduce the chain lengths for the newest or most recent snapshots, which may comprise the snapshots of Virtual Machine A that are the most likely to be accessed. In some cases, a rebasing operation (e.g., that moves the full image snapshot for a set of virtual machine snapshots to correspond with the most recent snapshot version) may be triggered when a number of forward incremental files is greater than a threshold number of forward incremental files for a snapshot chain (e.g., more than 200 forward incremental files). In other cases, a rebasing operation may be triggered when the total disk size for the forward incremental files exceeds a threshold disk size (e.g., is greater than 200 GB) or is greater than a threshold percentage (e.g., is greater than 20%) of the base image for the snapshot chain.

In some cases, the rebasing process may be part of a periodic rebasing process that is applied at a rebasing frequency (e.g., every 24 hours) to each virtual machine of a plurality of protected virtual machines to reduce the number of forward incremental files that need to be patched to a base image in order to restore the most recent version of a virtual machine. Periodically reducing the number of forward incremental files may reduce the time to restore the most recent version of the virtual machine as the number of forward incremental files that need to be applied to a base image to generate the most recent version may be limited. In one example, if a rebasing process is applied to snapshots of a virtual machine every 24 hours and snapshots of the virtual machine are acquired every four hours, then the number of forward incremental files may be limited to at most five forward incremental files.

As depicted, the second set of files includes a set of reverse incrementals (R11-R12 and R1-R4) and a full image (Base2). The set of virtual machine snapshots includes the different versions of the virtual machine (versions V1-V7 of Virtual Machine A) captured at the different points in time (times T1-T7) depicted in FIG. 2A. In some cases, the file size of the reverse incremental R2 may be substantially less than the file size of the base image Base2. The reverse incremental R2 corresponds with version V2 of Virtual Machine A and the base image Base2 corresponds with version V7 of Virtual Machine A. In this case, the most recent version of Virtual Machine A (i.e., the most recent restore point for Virtual Machine A) comprises a full image. To generate earlier versions of Virtual Machine A, reverse incrementals may be applied to (or patched to) the full image Base2. Subsequent versions of Virtual Machine A may be stored as forward incrementals that depend from the full image Base2.

In one embodiment, a rebasing process may be applied to a first set of files associated with a virtual machine in order to generate a second set of files to replace the first set of files. The first set of files may include a first base image from which a first version of the virtual machine may be derived and a first forward incremental file from which a second version of the virtual machine may be derived. The second set of files may include a second reverse incremental file from which the first version of the virtual machine may be derived and a second base image from which the second version of the virtual machine may be derived. During the rebasing process, data integrity checking may be performed to detect and correct data errors in the files stored in a file system, such as distributed file system 112 in FIG. 1C, that are read to generate the second set of files.

FIG. 2E depicts one embodiment of a merged file for generating version V7 of Virtual Machine A using the second set of files depicted in FIG. 2D. The merged file includes a first pointer (pBase2) that references the base image Base2 (e.g., via the path /snapshots/VM_A/s7/s7.full). In this case, the full image of version V7 of Virtual Machine A may be directly acquired without patching forward incrementals or reverse incrementals to the base image Base2 corresponding with version V7 of Virtual Machine A.

FIG. 2F depicts one embodiment of a merged file for generating version V2 of Virtual Machine A using the second set of files depicted in FIG. 2D. The merged file includes a first pointer (pBase2) that references the base image Base2 (e.g., via the path /snapshots/VM_A/s7/s7.full), a second pointer (pR11) that references the reverse incremental R11 (e.g., via the path /snapshots/VM_A/s6/s6.delta), a third pointer (pR12) that references the reverse incremental R12 (e.g., via the path /snapshots/VM_A/s5/s5.delta), a fourth pointer (pR1) that references the reverse incremental R1 (e.g., via the path /snapshots/VM_A/s4/s4.delta), a fifth pointer (pR2) that references the reverse incremental R2 (e.g., via the path /snapshots/VM_A/s3/s3.delta), and a sixth pointer (pR3) that references the reverse incremental R3 (e.g., via the path /snapshots/VM_A/s2/s2.delta). In one embodiment, to generate the full image of version V2 of Virtual Machine A, the base image may be acquired, the data changes associated with reverse incremental R11 may be applied to the base image to generate a first intermediate image, the data changes associated with reverse incremental R12 may be applied to the first intermediate image to generate a second intermediate image, the data changes associated with reverse incremental R1 may be applied to the second intermediate image to generate a third intermediate image, the data changes associated with reverse incremental R2 may be applied to the third intermediate image to generate a fourth intermediate image, and then the data changes associated with reverse incremental R3 may be applied to the fourth intermediate image to generate the full image of version V2 of Virtual Machine A.

Figures 2G, 2H, 2I:
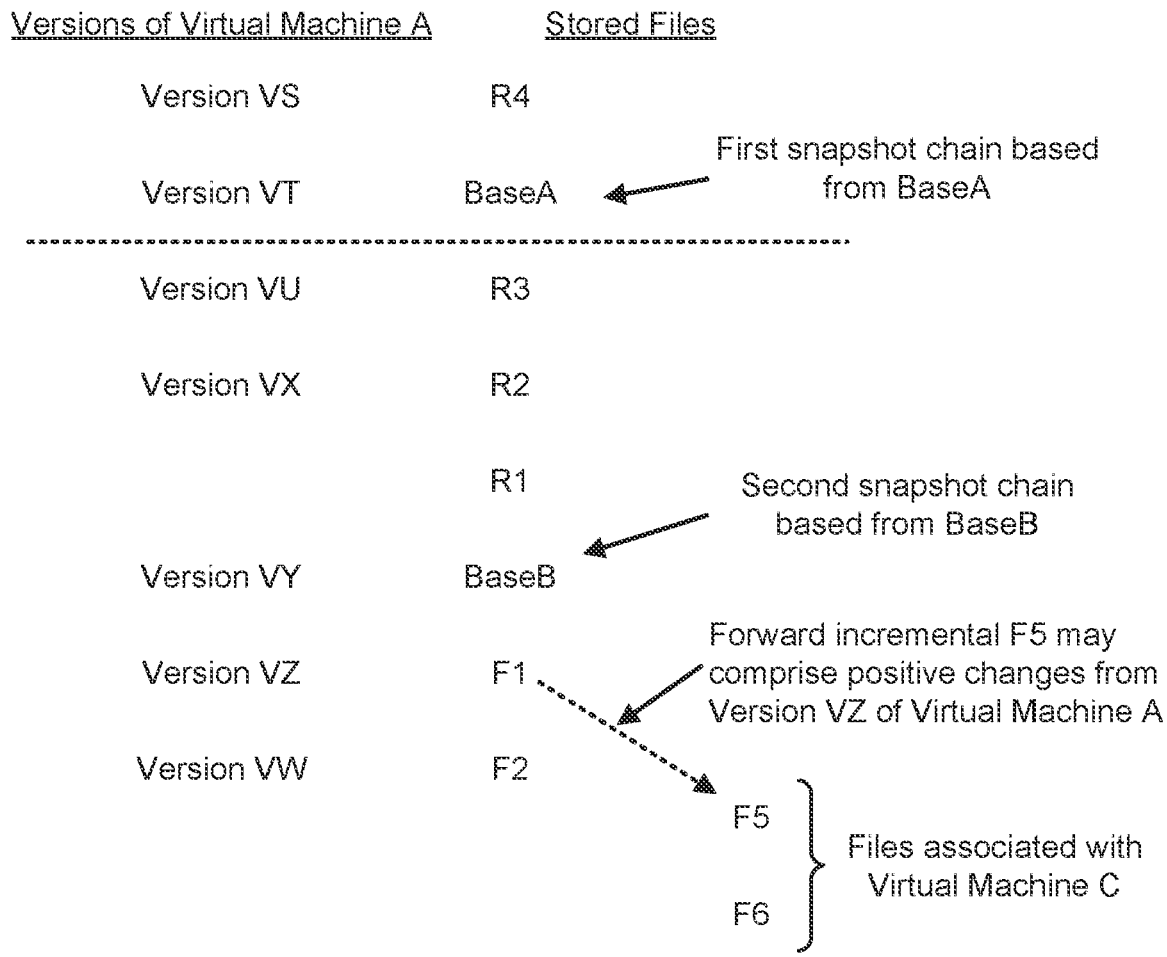

FIG. 2G depicts one embodiment of a set of files associated with multiple virtual machine snapshots. The set of files may be stored using a distributed file system, such as distributed file system 112 in FIG. 1C. As depicted, the set of files includes a second full image (BaseB), a set of forward incrementals (F1-F2 and F5-F6) that derive from the second full image (BaseB), and a set of reverse incrementals (R1-R3) that derive from the second full image (BaseB). The set of files also includes a first full image (BaseA) and a reverse incremental (R4) that derives from the first full image (BaseA). In this case, the depicted snapshots for Virtual Machine A include two different full image snapshots (BaseA and BaseB). Each of the full image snapshots may comprise an anchor snapshot for a snapshot chain. The first full image (BaseA) and the reverse incremental (R4) may comprise a first snapshot chain with the first full image acting as the anchor snapshot. A second snapshot chain may comprise the second full image (BaseB) acting as the anchor snapshot for the second snapshot chain, the set of forward incrementals (F1-F2), and the set of reverse incrementals (R1-R3). The first snapshot chain and the second snapshot chain may be independent of each other and independently managed. For example, the base image associated with the second snapshot chain for Virtual Machine A may be repositioned (e.g., via rebasing) without impacting the first snapshot chain for Virtual Machine A.

A third snapshot chain for Virtual Machine C may comprise the second full image (BaseB) and forward incrementals (F1 and F5-F6). The first snapshot chain for Virtual Machine A and the third snapshot chain for Virtual Machine C may be independent of each other and independently managed. However, as Virtual Machine C is a dependent virtual machine that depends from the second snapshot chain for Virtual Machine A, changes to the second snapshot chain may impact the third snapshot chain. For example, repositioning of the base image for the second snapshot chain due to rebasing may require the merged files for the third snapshot chain to be updated.

In some embodiments, each of the snapshot chains for Virtual Machine A may have a maximum incremental chain length (e.g., no more than 100 total incremental files), a maximum reverse incremental chain length (e.g., no more than 50 reverse incremental files), and a maximum forward incremental chain length (e.g., no more than 70 forward incremental files. In the event that a new snapshot will cause one of the snapshot chains to violate the maximum incremental chain length, the maximum reverse incremental chain length, or the maximum forward incremental chain length, then a new snapshot chain may be created for Virtual Machine A and a new full-image base file may be stored for the new snapshot chain.

FIG. 2H depicts one embodiment of a merged file for generating version VS of Virtual Machine A using the set of files depicted in FIG. 2G. The merged file includes a first pointer (pBaseA) that references the first base image BaseA and a second pointer (pR4) that references the reverse incremental R4. In one embodiment, to generate the full image of version VS of Virtual Machine A, the first base image associated with Version VT of Virtual Machine A may be acquired and the data changes associated with reverse incremental R4 may be applied to the first base image to generate the full image of version VS of Virtual Machine A.

FIG. 2I depicts one embodiment of a merged file for generating version VU of Virtual Machine A using the set of files depicted in FIG. 2G. The merged file includes a first pointer (pBaseB) that references the second base image BaseB, a second pointer (pR1) that references the reverse incremental R1, a third pointer (pR2) that references the reverse incremental R2, and a fourth pointer (pR3) that references the reverse incremental R3. In one embodiment, to generate the full image of version VU of Virtual Machine A, the second base image associated with Version VY of Virtual Machine A may be acquired, the data changes associated with reverse incremental R1 may be applied to the second base image to generate a first intermediate image, the data changes associated with reverse incremental R2 may be applied to the first intermediate image to generate a second intermediate image, and the data changes associated with reverse incremental R3 may be applied to the second intermediate image to generate the full image of version VU of Virtual Machine A.

Figures 2J, 2K:
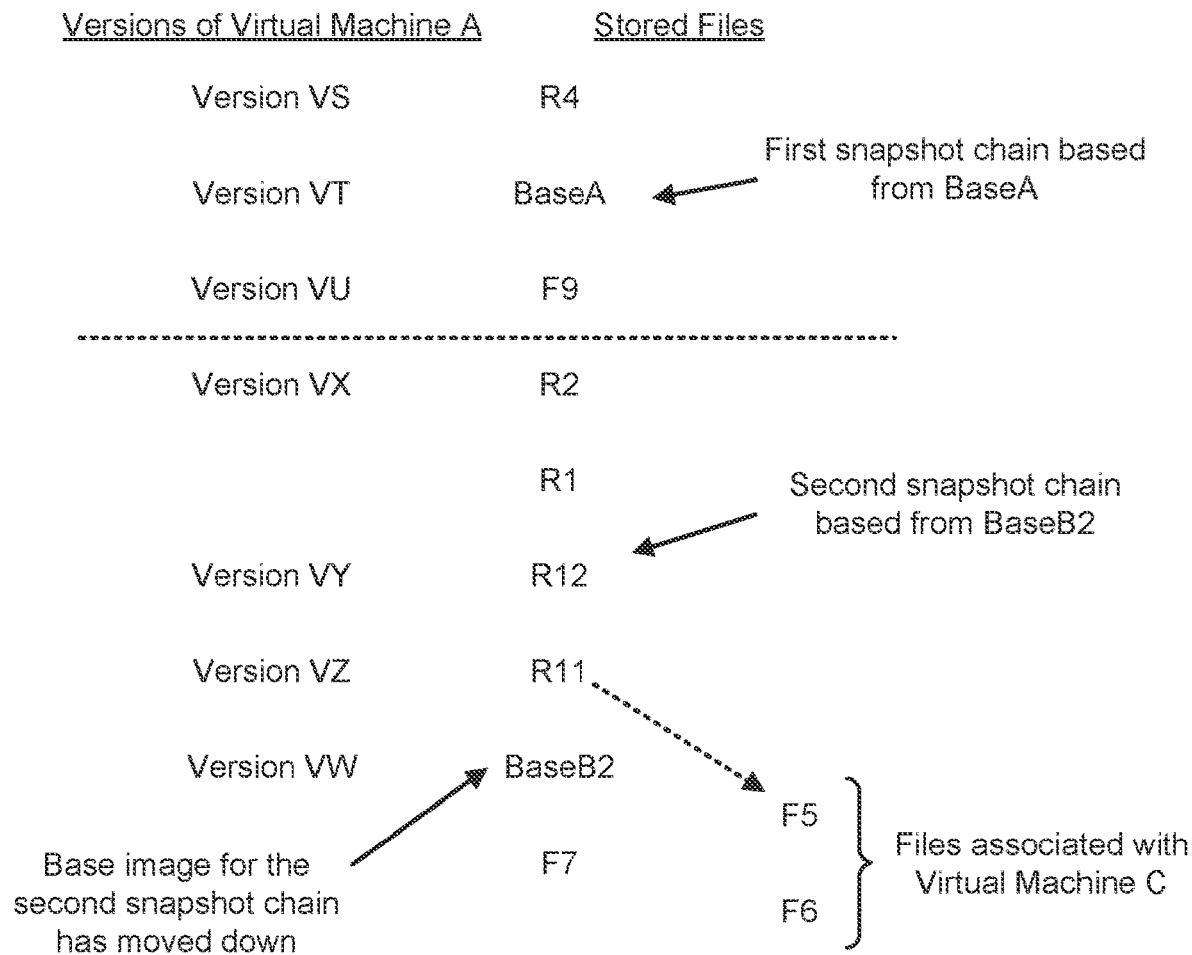

FIG. 2J depicts one embodiment of a set of files associated with multiple virtual machine snapshots after a rebasing process has been performed to a snapshot chain using the set of files in FIG. 2G. The set of files may be stored using a distributed file system, such as distributed file system 112 in FIG. 1C. The rebasing process may generate new files R12, R11, and BaseB2. As depicted, the set of files includes a set of reverse incrementals (R11-R12 and R1-R2), a full image (BaseB2), and a set of forward incrementals (F5-F7). In this case, a second version of Virtual Machine C may be generated using forward incrementals F5-F6 that are derived from Version VZ of Virtual Machine A. Forward incremental file F7 may include changes to Version VW of Virtual Machine A that occurred subsequent to the generation of the full image file BaseB2. In some cases, the forward incremental file F7 may comprise a writeable file or have file permissions allowing modification of the file, while all other files associated with earlier versions of Virtual Machine A comprise read only files.

FIG. 2K depicts one embodiment of a merged file for generating version VU of Virtual Machine A using the set of files depicted in FIG. 2J. The merged file includes a first pointer (pBaseA) that references the first base image BaseA and a second pointer (pF9) that references the forward incremental F9. In one embodiment, to generate the full image of version VU of Virtual Machine A, the first base image associated with Version VT of Virtual Machine A may be acquired and the data changes associated with forward incremental F9 may be applied to the first base image to generate the full image of version VU of Virtual Machine A.

In some embodiments, upon detection that a second snapshot chain has reached a maximum incremental chain length (e.g., no more than 500 total incremental files), a maximum reverse incremental chain length (e.g., no more than 400 reverse incremental files), or a maximum forward incremental chain length (e.g., no more than 150 forward incremental files), an existing snapshot chain (e.g., the first snapshot chain depicted in FIG. 2J) may have its chain length extended or snapshots previously assigned to the second snapshot chain may be moved to the existing snapshot chain. For example, the first snapshot chain depicted in FIG. 2G comprises two total snapshots, while the first snapshot chain depicted in FIG. 2J comprises three total snapshots as the snapshot corresponding with version VU of Virtual Machine A has moved from the second snapshot chain to the first snapshot chain.

In some embodiments, the number of snapshots in a snapshot chain may decrease over time as older versions of a virtual machine are consolidated, archived, deleted, or moved to a different storage domain (e.g., to cloud storage) depending on the data backup and archiving schedule for the virtual machine. In some cases, the maximum incremental chain length or the maximum number of snapshots for a snapshot chain may be increased over time as the versions stored by the snapshot chain age. In one example, if the versions of a virtual machine stored using a snapshot chain are all less than one month old, then the maximum incremental chain length may be set to a maximum of 200 incrementals; however, if the versions of the virtual machine stored using the snapshot chain are all greater than one month old, then the maximum incremental chain length may be set to a maximum of 1000 incrementals.

In some embodiments, the maximum incremental chain length for a snapshot chain may be increased over time as the number of allowed snapshots in a snapshot chain may be increased as the backed-up versions of a virtual machine get older. For example, the maximum incremental chain length for a snapshot chain storing versions of a virtual machine that are less than one year old may comprise a maximum incremental chain length of 200 incrementals, while the maximum incremental chain length for a snapshot chain storing versions of a virtual machine that are more than one year old may comprise a maximum incremental chain length of 500 incrementals.

Figure 3A:
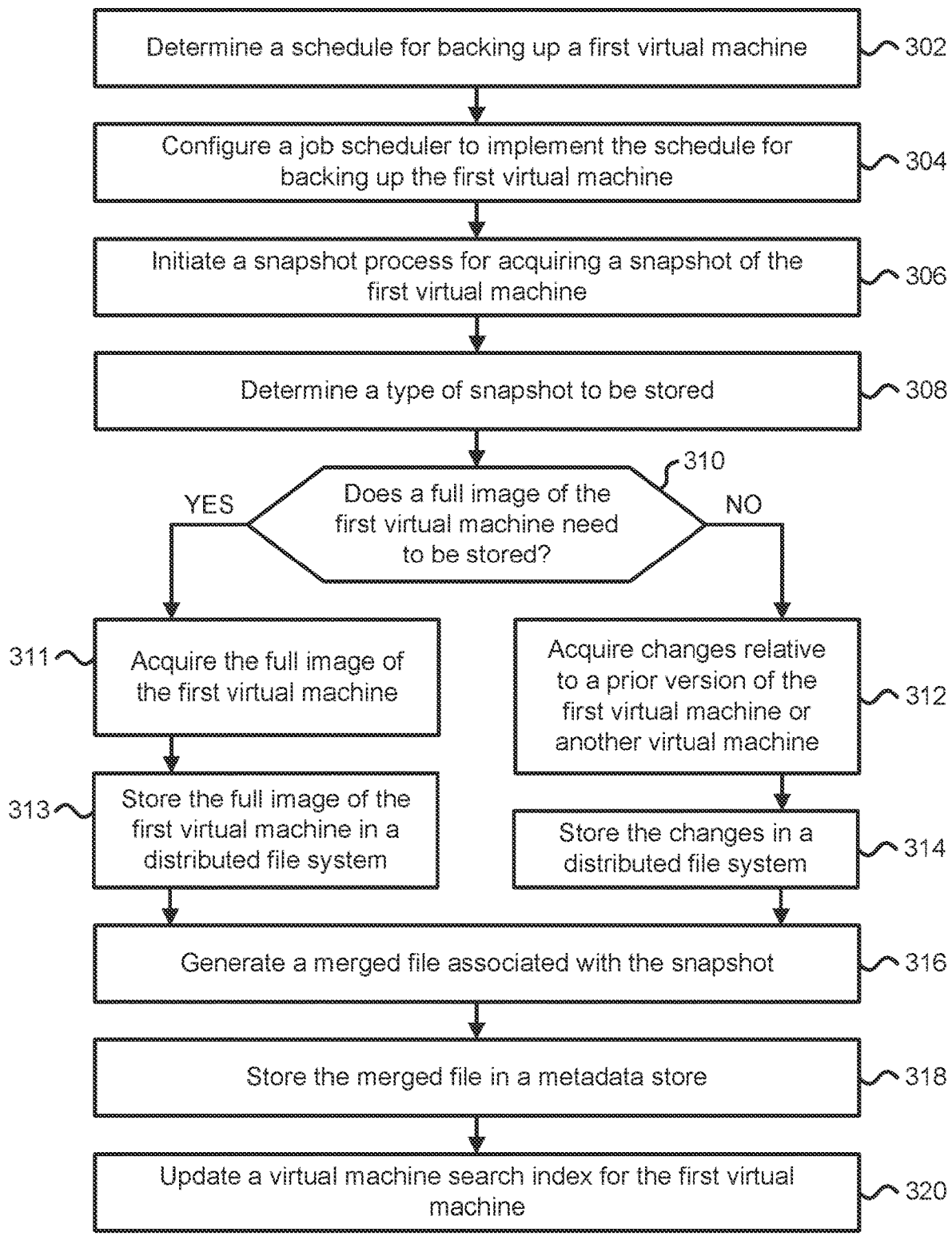
FIG. 3A is a flowchart describing one embodiment of a process for managing and storing virtual machine snapshots using a data storage system.

FIG. 3A is a flowchart describing one embodiment of a process for managing and storing virtual machine snapshots using a data storage system. In one embodiment, the process of FIG. 3A may be performed by a storage appliance, such as storage appliance 170 in FIG. 1A.

In step 302, a schedule for backing up a first virtual machine is determined. In one example, the schedule for backing up the first virtual machine may comprise periodically backing up the first virtual machine every four hours. The schedule for backing up the first virtual machine may be derived from a new backup, replication, and archival policy or backup class assigned to the first virtual machine. In step 304, a job scheduler is configured to implement the schedule for backing up the first virtual machine. In one example, a distributed job scheduler, such as distributed job scheduler 108 in FIG. 1C, may be configured to schedule and run processes for capturing and storing images of the first virtual machine over time according the schedule. In step 306, a snapshot process for acquiring a snapshot of the first virtual machine is initiated. The snapshot process may send an instruction to a virtualized infrastructure manager, such as virtualization manager 169 in FIG. 1A, that requests data associated with the snapshot of the first virtual machine. In step 308, a type of snapshot to be stored is determined. The type of snapshot may comprise a full image snapshot or an incremental snapshot. In some cases, a full image snapshot may be captured and stored in order to serve as an anchor snapshot for a new snapshot chain. Versions of the first virtual machine may be stored using one or more independent snapshot chains, wherein each snapshot chain comprises a full image snapshot and one or more incremental snapshots. One embodiment of a process for determining the type of snapshot to be stored (e.g., storing either a full image snapshot or an incremental snapshot) is described later in reference to FIG. 3B.

In step 310, it is determined whether a full image of the first virtual machine needs to be stored in order to store the snapshot of the first virtual machine. The determination of whether a full image is required may depend on whether a previous full image associated with a prior version of the first virtual machine has been acquired. The determination of whether a full image is required may depend on the determination of the type of snapshot to be stored in step 308. If a full image needs to be stored, then step 311 is performed. Otherwise, if a full image does not need to be stored, then step 312 is performed. In step 311, the full image of the first virtual machine is acquired. The full image of the first virtual machine may correspond with a file or one or more data chunks. In step 312, changes relative to a prior version of the first virtual machine or relative to another virtual machine (e.g., in the case that the first virtual machine comprises a dependent virtual machine whose snapshots derive from a full image snapshot of a second virtual machine different from the first virtual machine) are acquired. The changes relative to the prior version of the first virtual machine or relative to a version of a different virtual machine may correspond with a file or one or more data chunks. In step 313, the full image of the first virtual machine is stored using a distributed file system, such as distributed file system 112 in FIG. 1C. In step 314, the changes relative to the prior version of the first virtual machine or relative to another virtual machine are stored using a distributed file system, such as distributed file system 112 in FIG. 1C. In one embodiment, the full image of the first virtual machine may be stored using a first storage device of a first type (e.g., a HDD) and the changes relative to the prior version of the first virtual machine may be stored using a second storage device of a second type (e.g., an SSD).

In some embodiments, snapshots of the first virtual machine may be ingested at a snapshot capture frequency (e.g., every 30 minutes) by a data storage system. When a snapshot of the first virtual machine is ingested, the snapshot may be compared with other snapshots stored within the data storage system in order to identify a candidate snapshot from which the snapshot may depend. In one example, a scalable approximate matching algorithm may be used to identify the candidate snapshot whose data most closely matches the data associated with the snapshot or to identify the candidate snapshot whose data has the fewest number of data differences with the snapshot. In another example, an approximate matching algorithm may be used to identify the candidate snapshot whose data within a first portion of the candidate snapshot most closely matches data associated with a first portion of the snapshot. In some cases, a majority of the data associated with the snapshot and the candidate snapshot may be identical (e.g., both the snapshot and the candidate snapshot may be associated with virtual machines that use the same operating system and have the same applications installed). Once the candidate snapshot has been identified, then data differences (or the delta) between the snapshot and the candidate snapshot may be determined and the snapshot may be stored based on the data differences. In one example, the snapshot may be stored using a forward incremental file that includes the data differences between the snapshot and the candidate snapshot. The forward incremental file may be compressed prior to being stored within a file system, such as distributed file system 112 in FIG. 1C.

In step 316, a merged file associated with the snapshot is generated. The merged file may reference one or more files or one or more data chunks that have been acquired in either step 311 or step 312. In one example, the merged file may comprise a file or a portion of a file that includes pointers to the one or more files or the one or more data chunks. In step 318, the merged file is stored in a metadata store, such as distributed metadata store 110 in FIG. 1C. In step 320, a virtual machine search index for the first virtual machine is updated. The virtual machine search index for the first virtual machine may include a list of files that have been stored in the first virtual machine and a version history for each of the files in the list. In one example, the virtual machine search index for the first virtual machine may be updated to include new files that have been added to the first virtual machine since a prior snapshot of the first virtual machine was taken and/or to include updated versions of files that were previously stored in the first virtual machine.

Figure 3B:
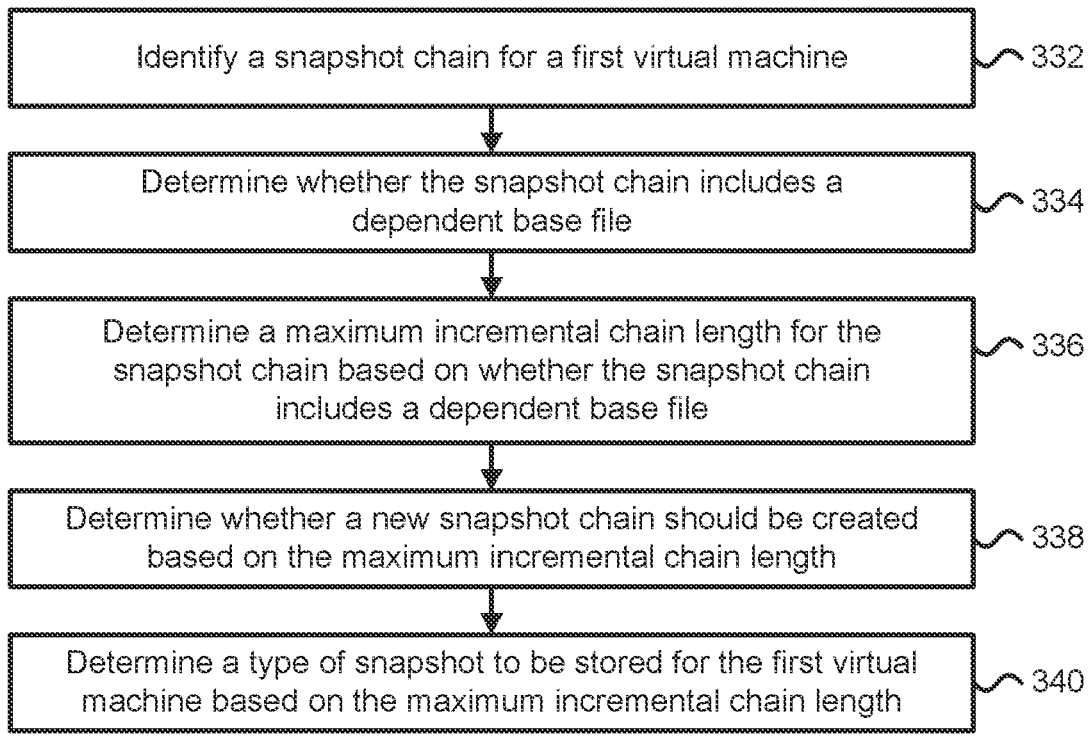
FIG. 3B is a flowchart describing one embodiment of a process for determining the type of snapshot to be stored using a data storage system.

FIG. 3B is a flowchart describing one embodiment of a process for determining the type of snapshot to be stored using a data storage system. The process described in FIG. 3B is one example of a process for implementing step 308 in FIG. 3A. In one embodiment, the process of FIG. 3B may be performed by a storage appliance, such as storage appliance 170 in FIG. 1A.

In step 332, a snapshot chain for a first virtual machine is identified. The snapshot chain may comprise a full image snapshot for the first virtual machine and one or more incremental snapshots that derive from the full image snapshot. Backed-up versions of the first virtual machine may correspond with one or more snapshot chains. Each of the one or more snapshot chains may include a full image snapshot or a base image from which incremental snapshots may derive.

In step 334, it is determined whether the snapshot chain includes a dependent base file. In this case, the first virtual machine may comprise a dependent virtual machine that has snapshots that derive from a full image snapshot of a different virtual machine. In one embodiment, the first virtual machine and the different virtual machine from which the first virtual machine depends may each have different virtual machine configuration files for storing configuration settings for the virtual machines. In one example, the first virtual machine may have a first number of virtual processors (e.g., two processors) and the different virtual machine may have a second number of virtual processors different from the first number of virtual processors (e.g., four processors). In another example, the first virtual machine may have a first virtual memory size (e.g., 1 GB) and the different virtual machine may have a second virtual memory size different from the first virtual memory size (e.g., 2 GB). In another example, the first virtual machine may run a first guest operating system and the different virtual machine may run a second guest operating system different from the first guest operating system.

In step 336, a maximum incremental chain length for the snapshot chain is determined based on whether the snapshot chain includes a dependent base file. In one example, if the first virtual machine comprises a dependent virtual machine, then the maximum incremental chain length may be set to a maximum length of 200 snapshots; however if the first virtual machine is independent and is not a dependent virtual machine, then the maximum incremental chain length may be set to a maximum length of 500 snapshots.

In one embodiment, the maximum incremental chain length for the snapshot chain may be determined based on an age of the backed-up versions within the snapshot chain. In one example, the maximum incremental chain length for a snapshot chain storing versions of the first virtual machine that are less than one year old may comprise a maximum incremental chain length of 100 incrementals, while the maximum incremental chain length for a snapshot chain storing versions of the first virtual machine that are more than one year old may comprise a maximum incremental chain length of 200 incrementals.

In step 338, it is determined whether a new snapshot chain should be created based on the maximum incremental chain length. In step 340, a type of snapshot to be stored for the first virtual machine is determined based on the maximum incremental chain length. The type of snapshot may comprise either a full image snapshot or an incremental snapshot. In one embodiment, if the snapshot chain for the first virtual machine exceeds the maximum incremental chain length for the snapshot chain, then the type of snapshot to be stored for the first virtual machine may comprise a full image snapshot. In this case, an additional snapshot chain may be created for the first virtual machine.

In some embodiments, the number of snapshots in a snapshot chain may decrease over time as older versions of a virtual machine are consolidated, archived, deleted, or moved to a different storage domain (e.g., to cloud storage) depending on the data backup and archiving schedule for the virtual machine. In some cases, the maximum incremental chain length or the maximum number of snapshots for a snapshot chain may be increased over time as the versions stored by the snapshot chain age. In one example, if the versions of a virtual machine stored using a snapshot chain are all less than one month old, then the maximum incremental chain length may be set to a maximum of 200 incrementals; however, if the versions of the virtual machine stored using the snapshot chain are all greater than one month old, then the maximum incremental chain length may be set to a maximum of 1000 incrementals.

Figure 3C:
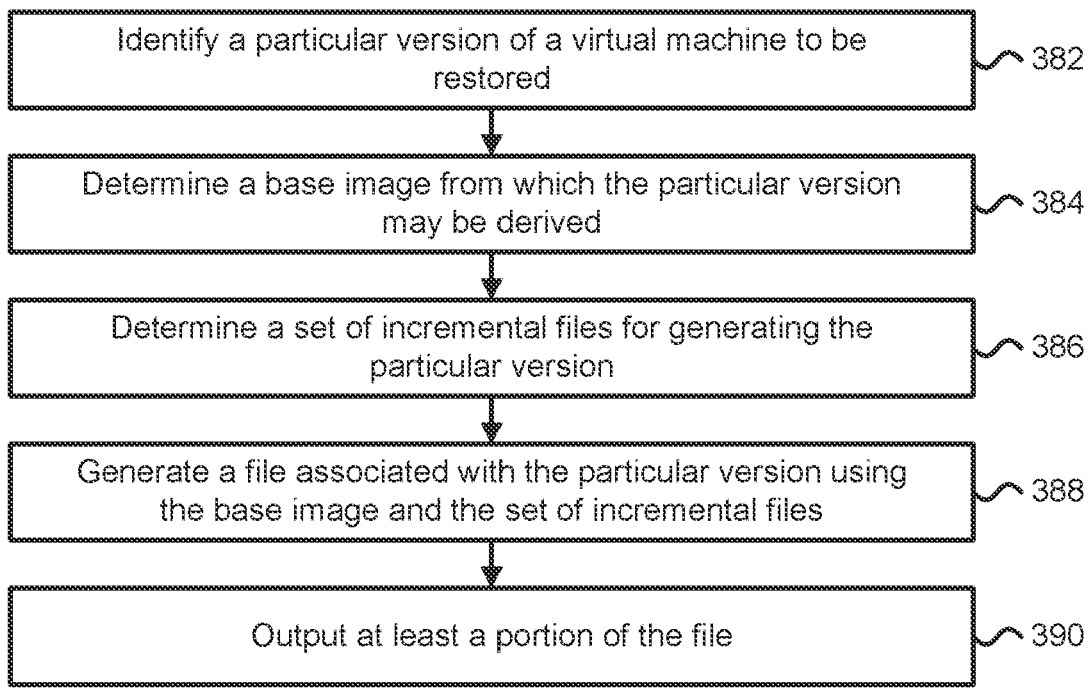
FIG. 3C is a flowchart describing one embodiment of a process for restoring a version of a virtual machine using a data storage system.

FIG. 3C is a flowchart describing one embodiment of a process for restoring a version of a virtual machine using a data storage system. In one embodiment, the process of FIG. 3C may be performed by a storage appliance, such as storage appliance 170 in FIG. 1A.

In step 382, a particular version of a virtual machine to be restored is identified. In step 384, a base image from which the particular version may be derived is determined. In step 386, a set of incremental files for generating the particular version is determined. In one embodiment, the base image and the set of incremental files may be determined from a merged file associated with the particular version of the virtual machine. In some cases, the set of incremental files may include one or more forward incremental files and/or one or more reverse incremental files. In step 388, a file associated with the particular version is generated using the base image and the set of incremental files. The file may be generated by patching the set of incremental files onto the base image. In step 390, at least a portion of the file is outputted. The at least a portion of the file may be electronically transferred to a computing device, such as computing device 154 in FIG. 1A, or to a virtualization manager, such as virtualization manager 169 in FIG. 1A.

To protect their data, an end user or a customer (e.g., a company) of a cloud-based service (e.g., a cloud-based email service or a cloud-based word processing application) may require that data backups of data stored within the cloud-based service are transferred to and stored within a cloud-based storage account that is controlled by the end user or the customer. The restriction to never transfer the data backups outside of the cloud-based storage account that is owned or controlled by the end user or customer allows the end user or customer to retain completely control over their data. In this case, the end user may provide restricted access to compute and data storage resources within their cloud-based storage account in order to perform data backup operations. The data storage resources may include binary large object (blob) storage, object storage, block storage, file storage, disk storage, or table storage. In one example, an external user may be given permissions to access and control compute and data storage resources within a resource group of the cloud-based storage account in order to orchestrate data backup operations, such as when and how to capture and store snapshots of a set of data that is being backed up, and to perform search index generation operations.

Figure 4A:
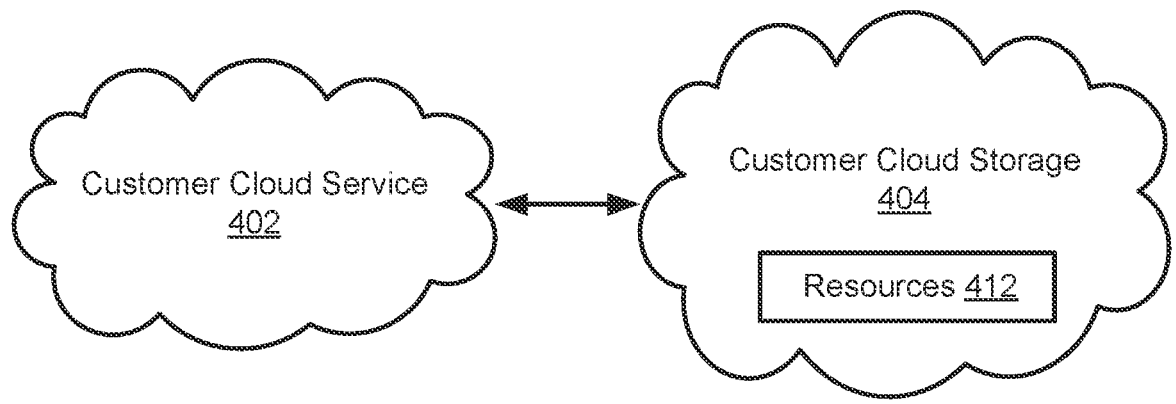
FIGS. 4A-4B depict various embodiments of a cloud computing environment that includes a customer cloud service and a customer cloud storage.

FIG. 4A depicts one embodiment of a cloud computing environment that includes a customer cloud service 402 and a customer cloud storage 404 in communication with the customer cloud service 402. The customer cloud service 402 may comprise a cloud-based subscription service (e.g., Office 365), a cloud-based file service (e.g., OneDrive), or a cloud-based productivity application. The customer cloud storage 404 may comprise a cloud-based storage service (e.g., Azure or S3). The customer cloud storage 404 may include resources 412 that may comprise computing and/or storage resources for storing snapshots of data from the customer cloud service 402, generating search indexes for the stored snapshots, and generating secondary layers comprising extracted portions of the stored snapshots from which the search indexes may be generated.

Figure 4B:
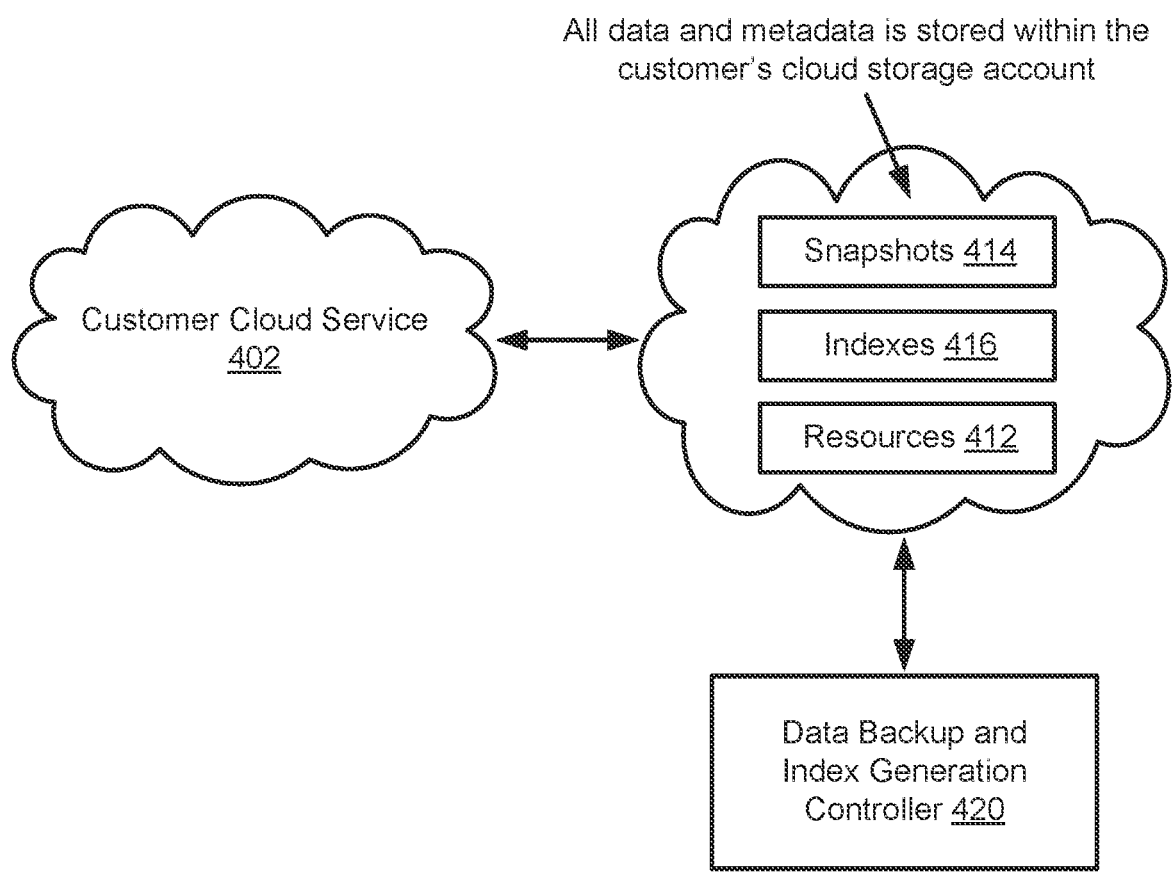

FIG. 4B depicts the cloud computing environment of FIG. 4A in which data and metadata from the customer cloud service 402 are stored within the customer cloud storage 404. As depicted, the resources 412 have been used to direct the customer cloud storage 404 to obtain data associated with snapshots 414 from the customer cloud service 402. The data backup and index generation controller 420 may direct the resources 412 within the customer cloud storage 404 to acquire the data associated with snapshots 414 from the customer cloud service 402. The data backup and index generation controller 420 may direct the resources 412 within the customer cloud storage 404 via one or more instructions transmitted to the resources 412. The data backup and index generation controller 420 may comprise a storage appliance, such as storage appliance 140 in FIG. 1A or a cloud-based SaaS platform that is configured to perform data management operations. The data backup and index generation controller 420 may orchestrate the capturing and storing of snapshots of data within the customer cloud storage 404 and the generation of search indexes corresponding with the stored snapshots, such as search indexes 416.

The snapshots 414 may comprise a plurality of snapshots that include a full image snapshot of a plurality of electronic messages (or emails) at a first point in time and a second incremental snapshot of the plurality of electronic messages at a second point in time subsequent to the first point in time. The search indexes 416 may comprise a plurality of search indexes, wherein each search index of the plurality of search indexes is associated with one of the snapshots of the plurality of snapshots. In some embodiments, a search index may be generated from a full image snapshot or from a portion of the full image snapshot. In the case that the full image snapshot comprises a plurality of electronic messages, the portion of the full image snapshot may be generated by extracting data associated with a subject line for each of the electronic messages, a sender line or field associated with a sender for each of the electronic messages, a receiver line or field associated with a receiver for each of the electronic messages, a carbon copy line or field associated with email addresses for receiving a copy of the electronic messages, and a first number of lines within a message body for each of the electronic messages (e.g., the first three lines of text within each of the electronic messages).

Figure 4C:
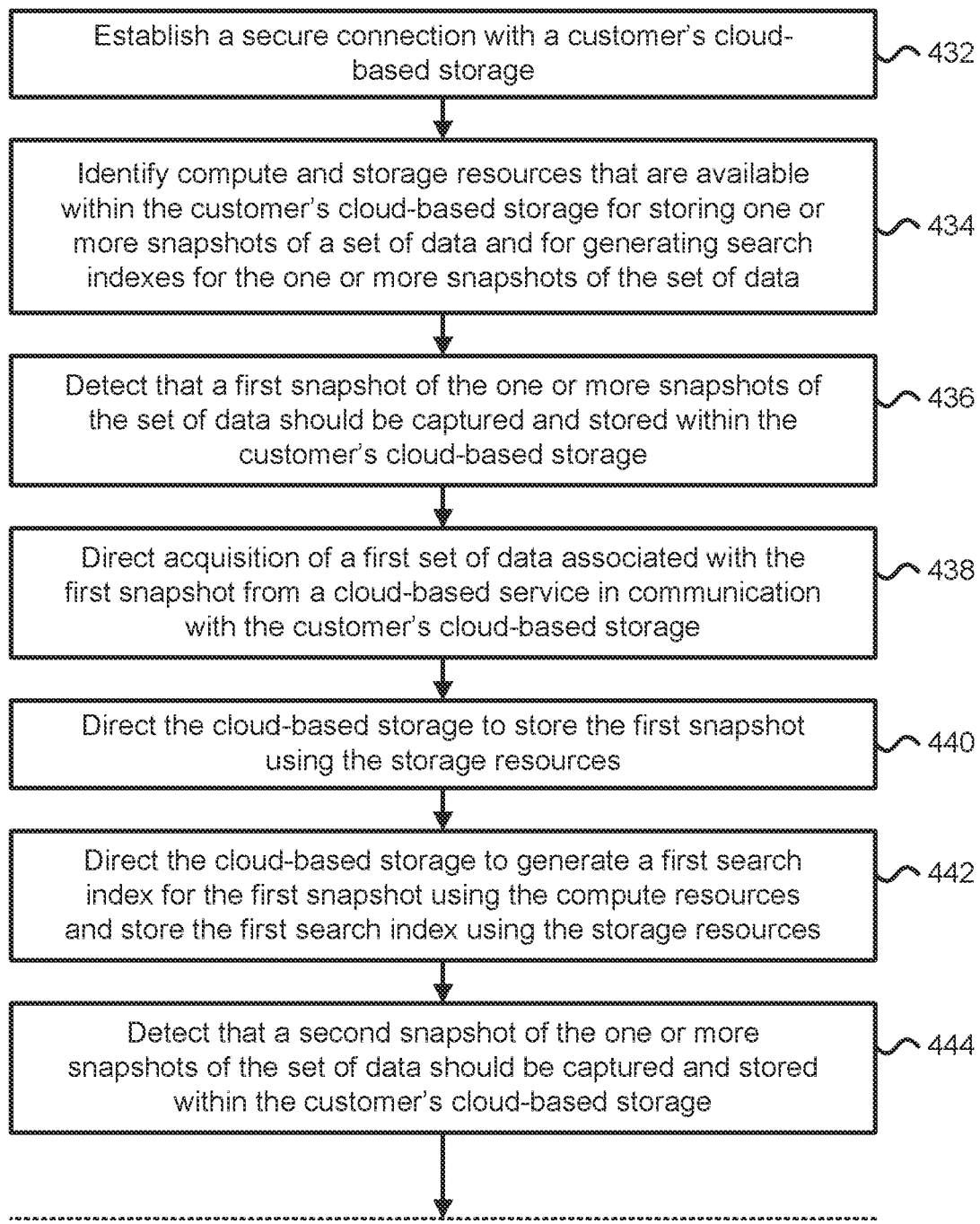
FIGS. 4C-4D depict a flowchart describing one embodiment of a process for orchestrating the capturing and storing of snapshots of a set of data from a cloud-based service controlled by a customer to a cloud-based storage service controlled by the customer.
Figure 4D:
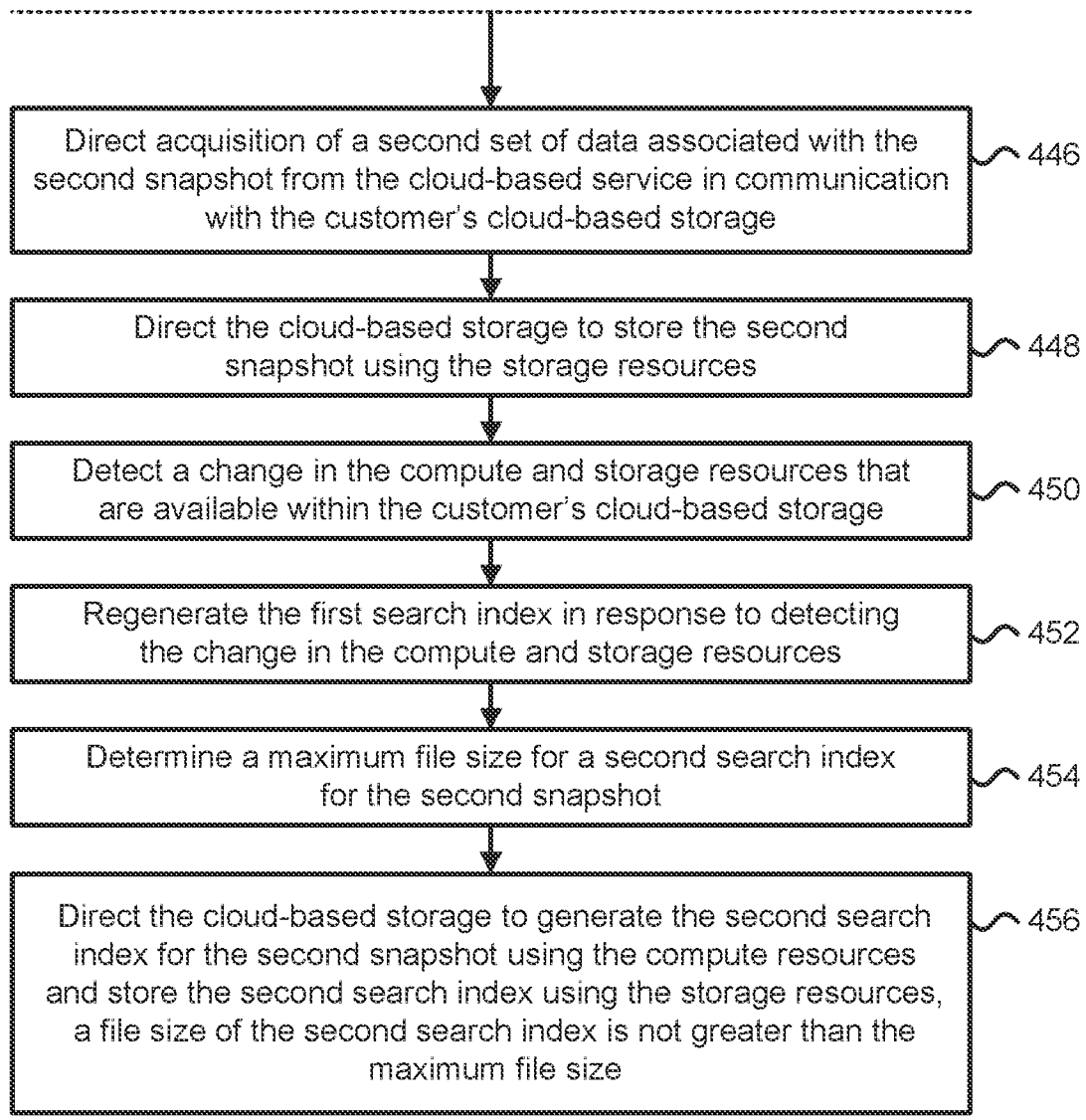

FIGS. 4C-4D depict a flowchart describing one embodiment of a process for orchestrating the capturing and storing of snapshots of a set of data from a cloud-based service controlled by a customer to a cloud-based storage service controlled by the customer. In one embodiment, the process of FIGS. 4C-4D may be performed by a controller, such as the data backup and index generation controller 420 in FIG. 4B. In another embodiment, the process of FIGS. 4C-4D may be performed by compute and storage resources, such as compute and storage resources 412 in FIG. 4B.

In step 432, a secure connection is established with a customer's cloud-based storage or a customer's cloud-based storage account. The secure connection may be established with the customer's cloud-based storage by authenticating to the cloud-based storage account using token-based authentication (e.g., via OAuth). The secure connection may allow for a data backup and index generation controller, such as the data backup and index generation controller 420 in FIG. 4B, to push computer software or an application to be executed using computing resources within the customer's cloud-based storage account. In step 434, compute and storage resources that are available within the customer's cloud-based storage for storing one or more snapshots of a set of data and for generating search indexes for the one or more snapshots of the set of data are identified. The compute and storage resources may correspond with resources 412 in FIG. 4B. The set of data may comprise a plurality of electronic messages. In one example, the plurality of electronic messages may comprise a current state of emails associated with a username or associated with an email application. In another example, the plurality of electronic messages may comprise numerous email inboxes associated with a plurality of usernames. In another example, the plurality of electronic messages may correspond with the states of a plurality of email applications used by a plurality of different end users of the plurality of email applications.

In step 436, it is detected that a first snapshot of the one or more snapshots of the set of data should be captured and stored within the customer's cloud-based storage. In one embodiment, it may be determined that the first snapshot should be captured and stored if it has been longer than a threshold period of time since the last snapshot of the set of data was captured and stored. The determination of whether to capture and store the first snapshot may depend on data backup policies for the set of data. A backup policy may require that snapshots of the set of data be captured every hour or every 24 hours. In step 438, acquisition of a first set of data associated with the first snapshot from a cloud-based service in communication with the customer's cloud-based storage is directed or orchestrated. In one example, the data backup and index generation controller 420 may direct the compute and storage resources 412 depicted in FIG. 4B to acquire the first set of data from the customer cloud service 402. The first set of data may comprise a full image snapshot or an incremental snapshot (e.g., a forward incremental snapshot).

In step 440, the cloud-based storage is directed to store the first snapshot using the storage resources. In step 442, the cloud-based storage is directed to generate a first search index for the first snapshot using the compute resources and store the first search index using the storage resources. In this case, the data backup and index generation controller 420 may direct the compute and storage resources 412 depicted in FIG. 4B to store the first snapshot using the storage resources and to generate and store the first search index for the first snapshot using the storage resources. In step 444, it is detected that a second snapshot of the one or more snapshots of the set of data should be captured and stored within the customer's cloud-based storage. The determination of whether to capture and store the second snapshot may depend on the data backup policies for the set of data. In step 446, acquisition of a second set of data associated with the second snapshot from the cloud-based service in communication with the customer's cloud-based storage is directed or orchestrated. In step 448, the cloud-based storage is directed to store the second snapshot using the storage resources.

In step 450, a change in the compute and storage resources that are available within the customer's cloud-based storage is detected. In one embodiment, the change in the compute and storage resources may comprise an increase or a decrease in the amount of disk space available to the storage resources. In another embodiment, the change in the compute and storage resources may comprise an increase or decrease in the number of processors for the compute resources. In step 452, the first search index is regenerated in response to detecting the change in the compute and storage resources. In one example, the first search index may be regenerated in order to reduce the size of the first search index in response to detecting that the amount of disk space available to the storage resources has decreased or fallen below a threshold amount of disk space. In step 454, a maximum file size for a second search index for the second snapshot is determined. In one example, the maximum file size for the second search index for the second snapshot may be determined based on the amount of available disk space within the storage resources or the total amount of disk space for the storage resources. If the amount of available disk space within the storage resources, such as the amount of available disk space for the resources 412 in FIG. 4B, is greater than a threshold amount of disk space (e.g., is greater than 10 TB), then the maximum file size for the second search index may be set to a first file size (e.g., 2 GB); however, if the amount of available disk space within the storage resources is not greater than the threshold amount of disk space, then the maximum file size for the second search index may be set to a second file size less than the first file size (e.g., 100 MB). In step 456, the cloud-based storage account is directed to generate the second search index for the second snapshot using the compute resources and store the second search index using the storage resources. In one example, the second search index is generated such that a file size of the second search index is not greater than the maximum file size. The file size of the second search index may depend on the number of fields extracted from the second snapshot of the set of data to generate the second search index. The fields may comprise a subject line field, a sender field, and a receiver field for an electronic message.

Figure 5A:
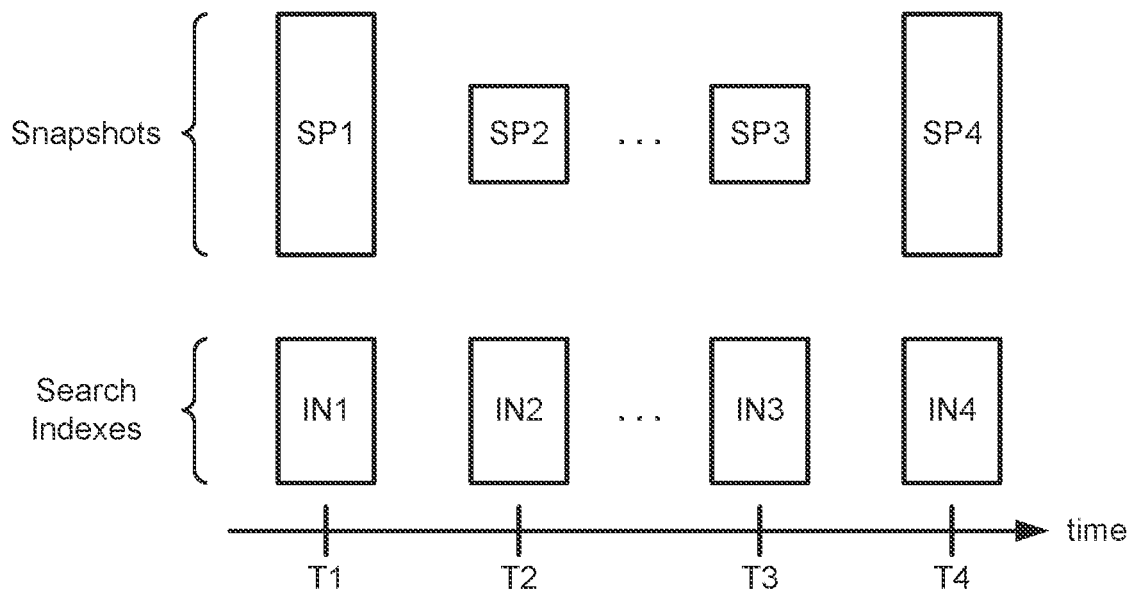
FIGS. 5A-5D depict various embodiment of point in time snapshots of a set of data and corresponding secondary layers and search indexes for the snapshots.

FIG. 5A depicts one embodiment of point in time snapshots of a set of data and corresponding search indexes for the snapshots. The set of data may comprise one or more electronic files associated with a real or virtual machine or a portion of a real or virtual machine. The set of data may comprise one or more electronic files or a plurality of electronic messages and may include both data and metadata from the one or more electronic files. The set of data may comprise an email mailbox for a user or a plurality of email mailboxes for a plurality of users (e.g., the set of data may comprise a concatenation of ten thousand email mailboxes). As depicted, the snapshot SP1 of the set of data corresponding with point in time version T1 and snapshot SP4 corresponding with point in time version T4 may comprise full image snapshots, while the snapshot SP2 corresponding with point in time version T2 and snapshot SP3 corresponding with point in time version T3 may comprise incremental snapshots (e.g., forward incremental snapshots that derive from the snapshot SP1 that corresponds with the point in time version T1 of the set of data). The search indexes IN1-IN4 may comprise hash-based indexes. The file sizes of the search indexes IN1-IN4 may be smaller than the file sizes for the snapshots SP1-SP4 as only search keys and pointers may be stored. The search index IN1 may comprise an index file for the snapshot SP1 that includes a plurality of index entries, wherein each index entry is associated with a search key value and a pointer or mapping to a location within the snapshot SP1. The search index IN1 may include an inverted index (e.g., a word-level inverted index) or an index data structure that stores a mapping from identified content (e.g., particular words) to locations within the snapshot SP1.

Figure 5B:
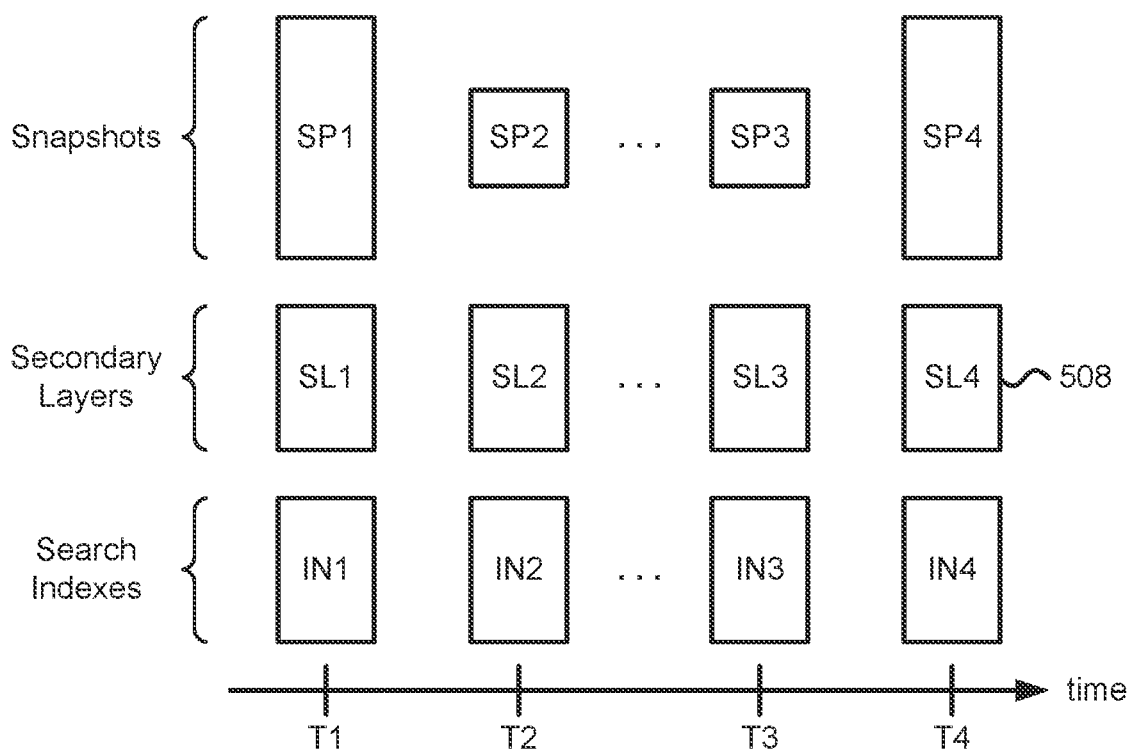

FIG. 5B depicts the point in time snapshots of the set of data in FIG. 5A and corresponding secondary layers for the snapshots. The secondary layers SL1-SL4 may comprise portions or subsets of the data within the snapshots SP1-SP4. In one example, the snapshot SP1 may comprise a snapshot of an email inbox and the corresponding secondary layer SL1 may comprise only the portions of the snapshot SP1 that are related to the subject, sender, and/or receiver fields for electronic messages within the email inbox. In this case, any attachments or text within the body of the electronic messages may have been extracted out or removed from the secondary layer SL1. The snapshots SP1-SP4 may be stored using a first type of data storage (e.g., blob storage) while the secondary layers SL1-SL4 are stored using a second type of data storage different from the first type of data storage (e.g., block storage or file-based storage).

In some embodiments, the snapshot SP1 may comprise a snapshot of an email mailbox and the corresponding secondary layer SL1 may comprise the portions of the snapshot SP1 that are related to the subject, sender, receiver, and date received fields for electronic messages within the email mailbox and a dynamically adjustable number of lines of text or a dynamically adjustable total number of text characters within the message bodies of the electronic messages. The dynamically adjustable number of lines of text and/or the dynamically adjustable total number of text characters within the message bodies may be adjusted over time depending on the amount of available disk space for storing the secondary layers SL1-SL4. The dynamically adjustable number of lines of text and/or the dynamically adjustable total number of text characters within the message bodies may be increased or decreased depending on prior user searching behavior. For example, the dynamically adjustable number of lines of text within the electronic message bodies may be increased if the user of the email mailbox has searched on snapshots within a particular date range more than a threshold number of times (e.g., has performed a keyword search on the snapshots SP1-SP4 more than twice within the past week). The search indexes IN1-IN4 may be generated from the secondary layers SL1-SL4 instead of being generated from the larger snapshots SP1-SP4. The search indexes IN1-IN4 may be stored using block storage or file-based storage.

Figure 5C:
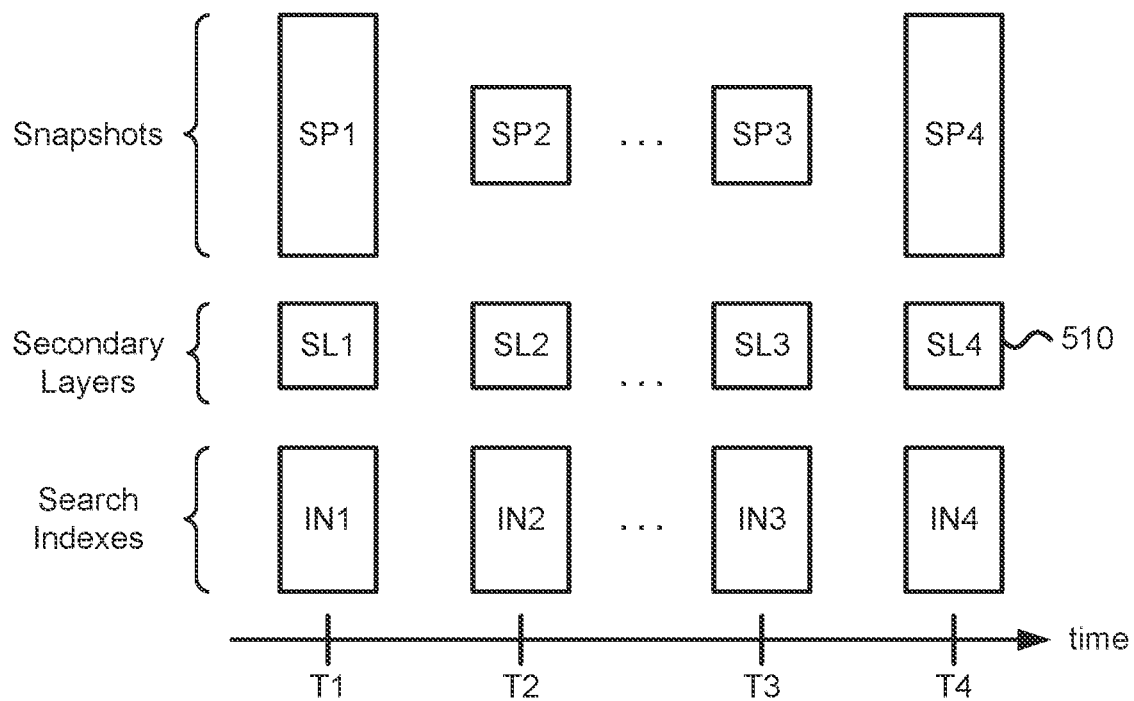

FIG. 5C depicts the snapshots, secondary layers, and search indexes of FIG. 5B wherein the secondary layers SL1-SL4 have been reduced in size (e.g., their file sizes may have been cut in half). A secondary layer may be regenerated to include less information if the amount of available disk space has fallen below a threshold amount of disk space (e.g., is less than 10 GBs of disk space), if the amount of available disk space has fallen below a threshold percentage of disk space (e.g., is less than 10% of the total disk space), or if the user of the email mailbox has not performed a search on the snapshots for at least a threshold period of time (e.g., the user of the email mailboxes has not performed a search within the past week). In one example, the secondary layer SL4 508 in FIG. 5B may comprise the subject, sender, receiver, and date received fields for the electronic messages within the email mailbox for the snapshot SP4 and include the first ten lines of text within the message bodies of the electronic messages, while the secondary layer SL4 510 in FIG. 5C may comprise only the subject, sender, receiver, and date received fields for the electronic messages within the email mailbox for the snapshot SP4 and not include any lines of text within the message bodies of the electronic messages.

Figure 5D:
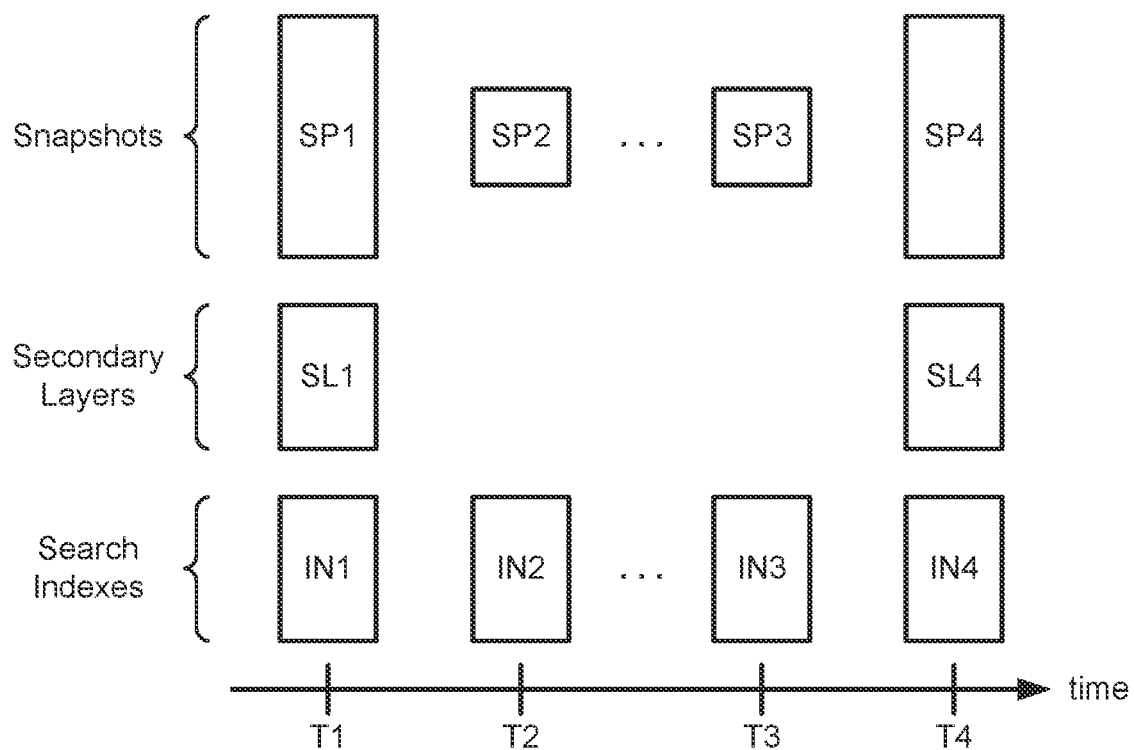

FIG. 5D depicts the snapshots, secondary layers, and search indexes of FIG. 5B after secondary layers SL2-SL3 have been removed. In one embodiment, if the amount of available disk space for storing secondary layers is less than a threshold amount of disk space (e.g., is less than 10 GBs of disk space), then one or more secondary layers may be deleted in order to free up disk space. The determination of which secondary layers should be deleted first may depend on whether the corresponding snapshots are full image snapshots or incremental snapshots. The determination of which secondary layers should be deleted may depend on prior user search behavior with secondary layers corresponding with snapshots that have not been searched for at least a threshold period of time being deleted (e.g., secondary layers corresponding with snapshots that have not been searched within the past month may be deleted to free up disk space).

Figure 5E:
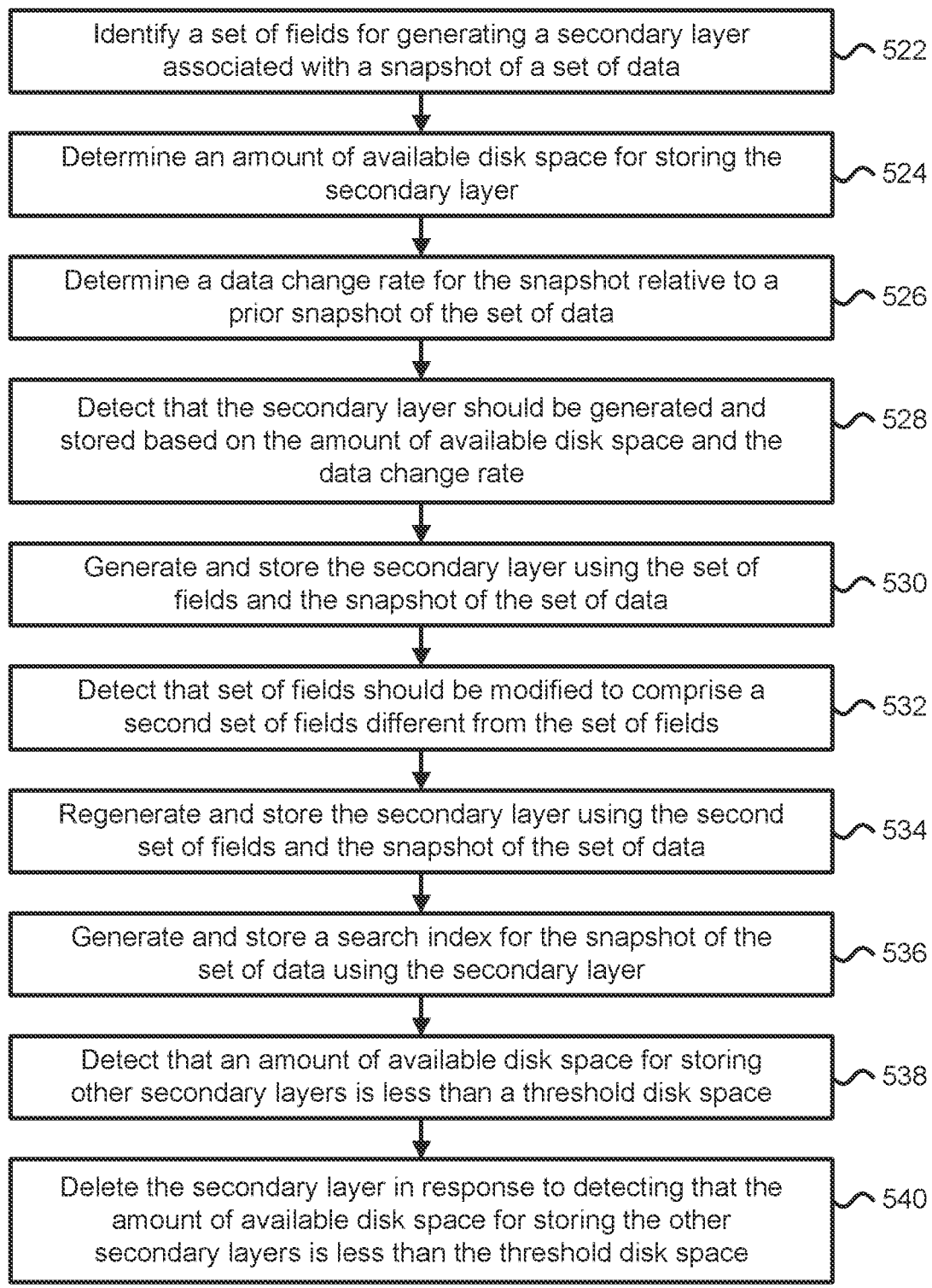
FIG. 5E is a flowchart describing one embodiment of a process for generating and storing secondary layers corresponding with snapshots of a set of data.

FIG. 5E is a flowchart describing one embodiment of a process for generating and storing secondary layers corresponding with snapshots of a set of data. In one embodiment, the process of FIG. 5E may be performed by a controller, such as the data backup and index generation controller 420 in FIG. 4B or by compute and storage resources, such as compute and storage resources 412 in FIG. 4B. In another embodiment, the process of FIG. 5E may be performed by a storage appliance, such as storage appliance 140 in FIG. 1A.

In step 522, a set of fields for generating a secondary layer associated with a snapshot of a set of data is identified. The set of data may comprise electronic messages and the set of fields may comprise a subject line field, a sender field, a receiver field, and a date received field for the electronic messages. In step 524, an amount of available disk space for storing the secondary layer is determined. In step 526, a data change rate for the snapshot relative to a prior snapshot of the set of data is determined. In one example, the data change rate may correspond with the number of data changes or the number of changed data blocks between the snapshot and an earlier point in time snapshot of the set of data. The earlier point in time snapshot of the set of data may comprise the previous snapshot of the set of data that was captured and stored prior to the snapshot. In step 528, it is detected that the secondary layer should be generated and stored based on the amount of available disk space and/or the data change rate. In one example, if the amount of available disk space is at least a threshold amount of disk space (e.g., there is at least 50 GBs of disk space remaining), then the secondary layer should be generated and stored. If the amount of available disk space is less than the threshold amount of disk space, then the secondary layer should not be generated. In another example, if the data change rate is greater than a threshold change rate, then the secondary layer should be generated and stored; otherwise, if the data change rate is not greater than the threshold change rate, then the secondary layer should not be generated.

In step 530, the secondary layer is generated and stored using the set of fields and the snapshot of the set of data. The secondary layer may be generated by extracting data associated with the set of fields from the snapshot of the set of data. In step 532, it is detected that the set of fields should be modified to comprise a second set of fields different from the set of fields. In one example, the second set of fields may include an additional field or comprise fewer fields than the set of fields. The second set of fields may comprise the set of fields minus a field for the body of an electronic message. The second set of fields may specify a fewer number of lines of text within the body of electronic messages (e.g., to extract two lines of text) compared with the set of fields (e.g., to extract up to twenty lines of text). In step 534, the secondary layer is regenerated and stored using the second set of fields and the snapshot of the set of data. The secondary layer may be regenerated by extracting data associated with the second set of fields from the snapshot of the set of data.

In step 536, a search index for the snapshot of the set of data is generated and stored. The search index may include an inverted index or an index data structure that stores a mapping for identified content (e.g., words and numbers) within the snapshot to the corresponding locations within the snapshot. In step 538, it is detected that an amount of available disk space for storing other secondary layers is less than a threshold disk space (e.g., is less than 10 GB). In step 540, the secondary layer is deleted in response to detecting that the amount of available disk space for storing the other secondary layers is less than the threshold disk space. In some embodiments, if it is detected that the amount of available disk space for storing the other secondary layers is less than the threshold disk space, then the secondary layers corresponding with snapshots that have not been searched within a past threshold amount of time (e.g., that have not been searched for the past week) may be deleted.

Figure 6A:
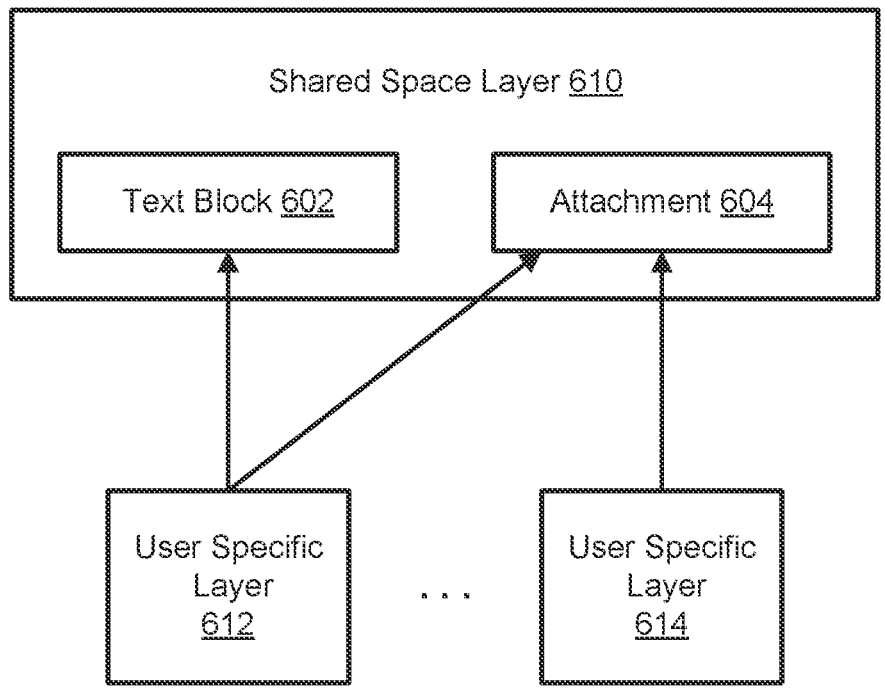
FIG. 6A depicts one embodiment of a multi-layered approach for storing snapshots of a set of data.

FIG. 6A depicts one embodiment of a multi-layered approach for storing a snapshot of a set of data. The set of data may comprise a snapshot of a virtual machine, a snapshot of a real machine, a snapshot of a set of electronic files, or a snapshot of electronic messages within a user's email mailbox. As depicted, an attachment 604 (e.g., comprising an email attachment such as a word processing document or an image file) and a text block 602 (e.g., comprising a paragraph of text within the body of an email message) have been identified and extracted from the set of data and stored within the shared space layer 610. The shared space layer 610 may be stored using block storage or file-based storage. The shared space layer 610 may be stored using storage resources, such as resources 412 in FIG. 4B. The user specific layer 612 may correspond with a first electronic message within a user's email mailbox and the user specific layer 614 may correspond with a second electronic message within the user's email mailbox. Both the first electronic message and the second electronic message may include the same attachment 604 and the first electronic message may include a text block corresponding with the text block 602 stored within the shared space layer 610.

In one embodiment, both the user specific layer 612 and the user specific layer 614 may correspond with electronic messages within a first user's email mailbox. In another embodiment, the user specific layer 612 may correspond with a first electronic message within a first user's email mailbox and the user specific layer 614 may correspond with a second electronic message within a second user's email mailbox. In one example, an electronic message may be sent to both the first user's and the second user's email mailboxes (e.g., the electronic message may be sent to email addresses associated with both the first user and the second user) that includes an attachment that is identical to the attachment 604 stored within the shared space layer 610. The user specific layer 612 and the user specific layer 614 may be stored as two separate files using block storage or file-based storage. The user specific layer 612 may include pointers to the text block 602 and the attachment 604 within the shared space layer 610. The user specific layer 614 may include a pointer to the attachment 604. The pointers within the user specific layers allows for multiple user specific layers to reference the same attachment or text block stored within the shared space layer 610.

In some cases, text level deduplication in which a text block is identified and stored within a shared space layer, such as text block 602, may only be performed if an electronic message is sent to at least a threshold number of email addresses (e.g., is sent to at least ten email addresses). In some cases, deduplication of email attachments in which an attachment is identified and stored within a shared space layer, such as attachment 604, may only be performed if an electronic message is sent to at least a threshold number of email addresses (e.g., is sent to at least two email addresses). It should be noted that an electronic message originating from within an organization and sent to an email address within the organization may require that a large attachment of the electronic message be stored twice (e.g., the large attachment may reside in email mailboxes for both the sender and the receiver of the electronic message).

Figure 6B:
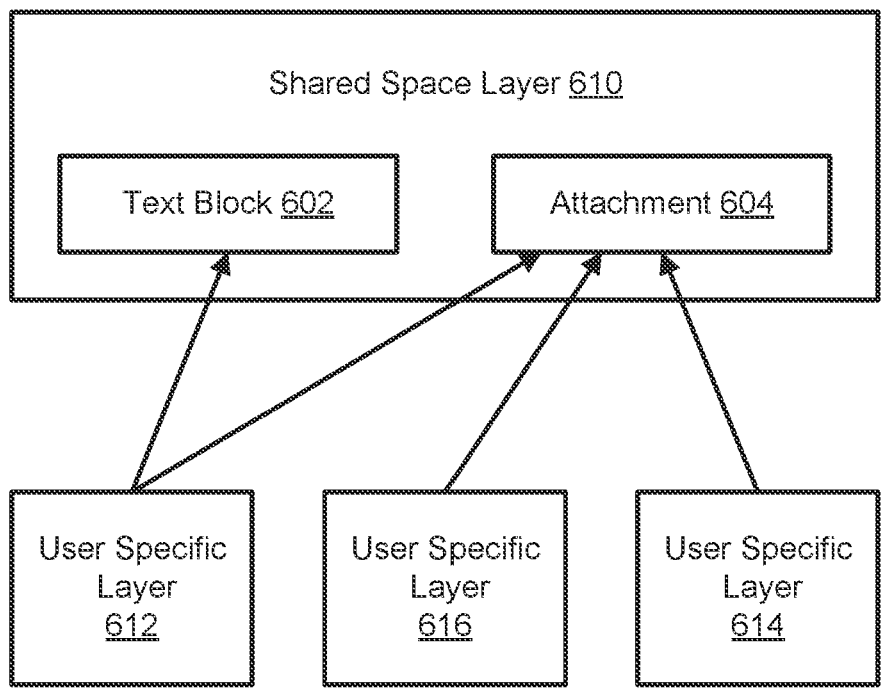
FIG. 6B depicts one embodiment of a multi-layered approach for deduplicating content.

FIG. 6B depicts one embodiment of a multi-layered approach for deduplicating content in which an attachment 604 within the shared space layer 610 of FIG. 6A is referenced by a new user specific layer 616 corresponding with a third electronic message. In this case, the third electronic message may comprise a copy of the second electronic message that has been forwarded to a third user's email mailbox. The multi-layered approach in which electronic messages across numerous user email mailboxes are partitioned into user specific layers corresponding with individual electronic messages with pointers into a shared space layer that is shared by the electronic messages allows for the efficient storage and deduplication of content across the numerous user email mailboxes.

In one embodiment, the state of the shared space layer 610 and the user specific layers 612-614 depicted in FIG. 6A may correspond with a first snapshot of numerous user email mailboxes at a first point in time and the state of the shared space layer 610 and the user specific layers 612-616 depicted in FIG. 6B may correspond with a second snapshot of the numerous user email mailboxes at a second point in time subsequent to the first point in time.

Figure 6C:
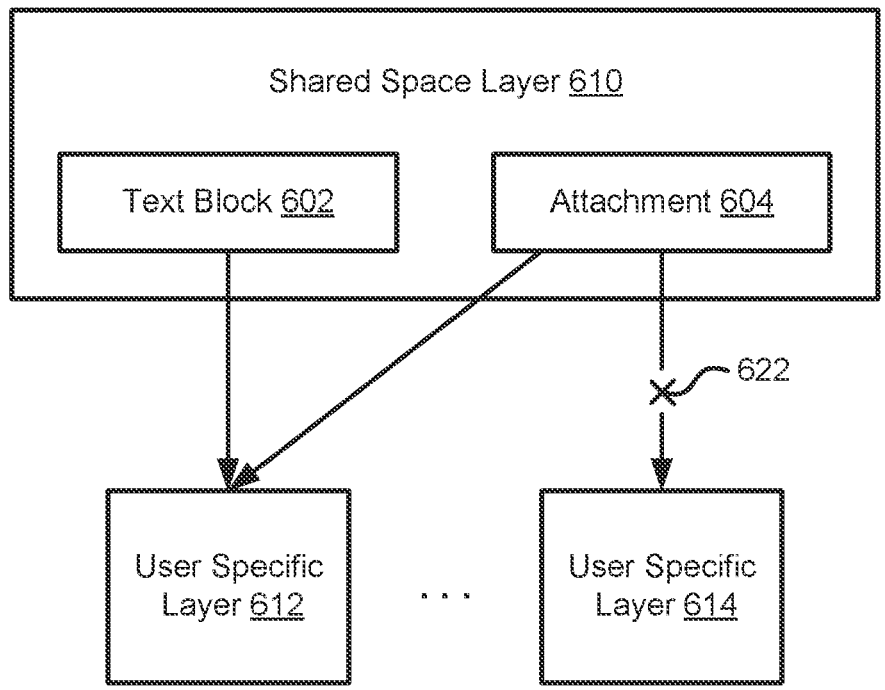
FIG. 6C depicts one embodiment of the state of the shared space layer and the user specific layers depicted in FIG. 6A in which a restore operation is performed to restore electronic messages corresponding with different user specific layers.

FIG. 6C depicts one embodiment of the state of the shared space layer 610 and the user specific layers 612-614 depicted in FIG. 6A in which a restore operation is performed to restore electronic messages corresponding with the user specific layer 612 and the user specific layer 614. As depicted, a first electronic message corresponding with the user specific layer 612 may be restored as the user requesting restoration of the first electronic message is authorized to access both the text block 602 and the attachment 604 within the shared space layer 610; however, a second electronic message corresponding with the user specific layer 614 may not be fully restored as a user requesting restoration of the second electronic message is not authorized to access the attachment 604 within the shared space layer 610. In this case, the ability of the second electronic message to reference the attachment 604 may be severed and a broken link 622 from the attachment 604 may prevent the contents of the attachment 604 from being pulled during restoration of the second electronic message.

In one embodiment, it may be detected that the attachment 604 includes a restricted keyword that matches one of a number of keywords associated with sensitive information and that the user does not have access permissions for data associated with the restricted keyword. In one example, the restricted keyword may correspond with a project codename, a particular person's name, or an identification number or username associated with a particular person. In the case that the user requesting restoration of an attachment or text block within a shared space layer does not have user access permissions to the attachment or text block that contains the restricted keyword, the attachment or the text block may be restored with the restricted keyword redacted from the attachment or the text block. In some cases, the attachment or the text block may be restored with a new keyword in place of the restricted keyword. In one example, a mapping table may be used to substitute the new keyword in place of the restricted keyword (e.g., substituting a new word for a restricted project codename).

In another embodiment, it may be detected that the attachment 604 is associated with a hash value that corresponds with one of a number of hash values associated with sensitive information. In one example, the attachment 604 may comprise an image or a slide deck and the hash value may be generated for the entire attachment 604 and then compared with a listing of hash values stored in a table of restricted hash values.

Figure 6D:
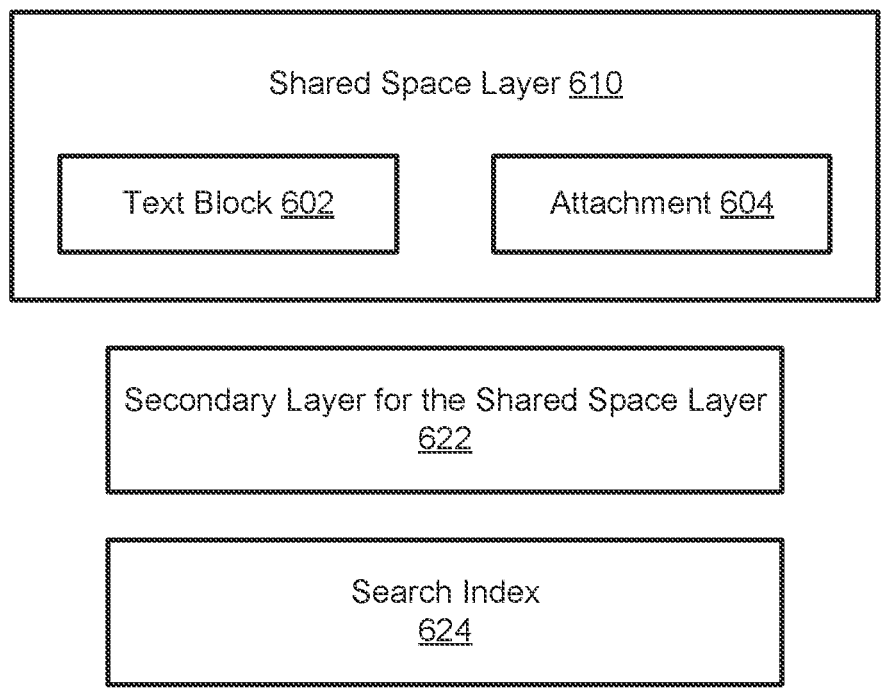
FIG. 6D depicts one embodiment of a secondary layer generated from a shared space layer and a search index.

FIG. 6D depicts one embodiment of a secondary layer 622 generated from a shared space layer 610 and a search index 624. In one embodiment, the search index 624 may be generated from the secondary layer 622. The secondary layer 622 may comprise a subset of the data within the shared space layer 610 less than all of the data within the shared space layer 610. In one example, the secondary layer 622 may comprise the first ten lines of the text block 602 or the first 100 characters within the text block 602 and OCR'd text from the attachment 604. The secondary layer 622 may be stored as a file with a file size that is substantially smaller in size than that of the shared space layer 610. In another embodiment, the search index 624 may be generated directly from the shared space layer 610.

In some embodiments, the number of lines extracted from the text block 602 to generate the second layer 622 may be set or adjusted based on the amount of disk space available within data storage resources, such as resources 412 in FIG. 4B. In one example, if the amount of disk space available within the data storage resources is greater than a threshold amount of disk space (e.g., is greater than 10 GB), then the number of lines extracted from the text block 602 may be set to a first number of lines (e.g., set to ten lines); however, if the amount of disk space available within the data storage resources is not greater than the threshold amount of disk space, then the number of lines extracted from the text block 602 may be set to a second number of lines (e.g., set to two lines) less than the first number of lines. In other embodiments, if the total amount of disk space available within the data storage resources falls below the threshold amount of disk space, then the secondary layer 622 may be deleted to free up disk space.

Figure 6E:
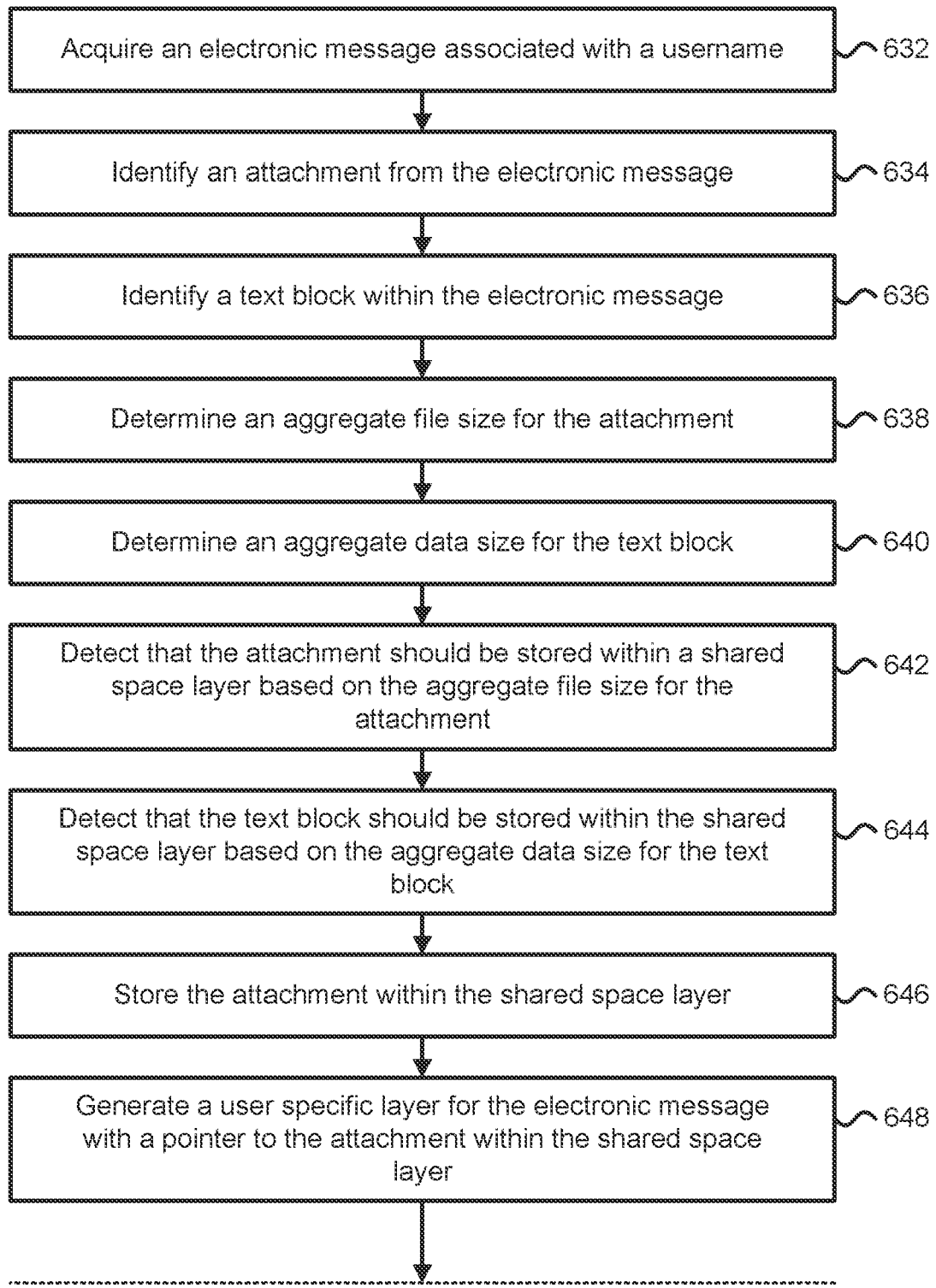
FIGS. 6E-6F depict a flowchart describing one embodiment of a process for deduplicating content using a shared space layer and one or more user specific layers that contain pointers into the shared space layer.
Figure 6F:
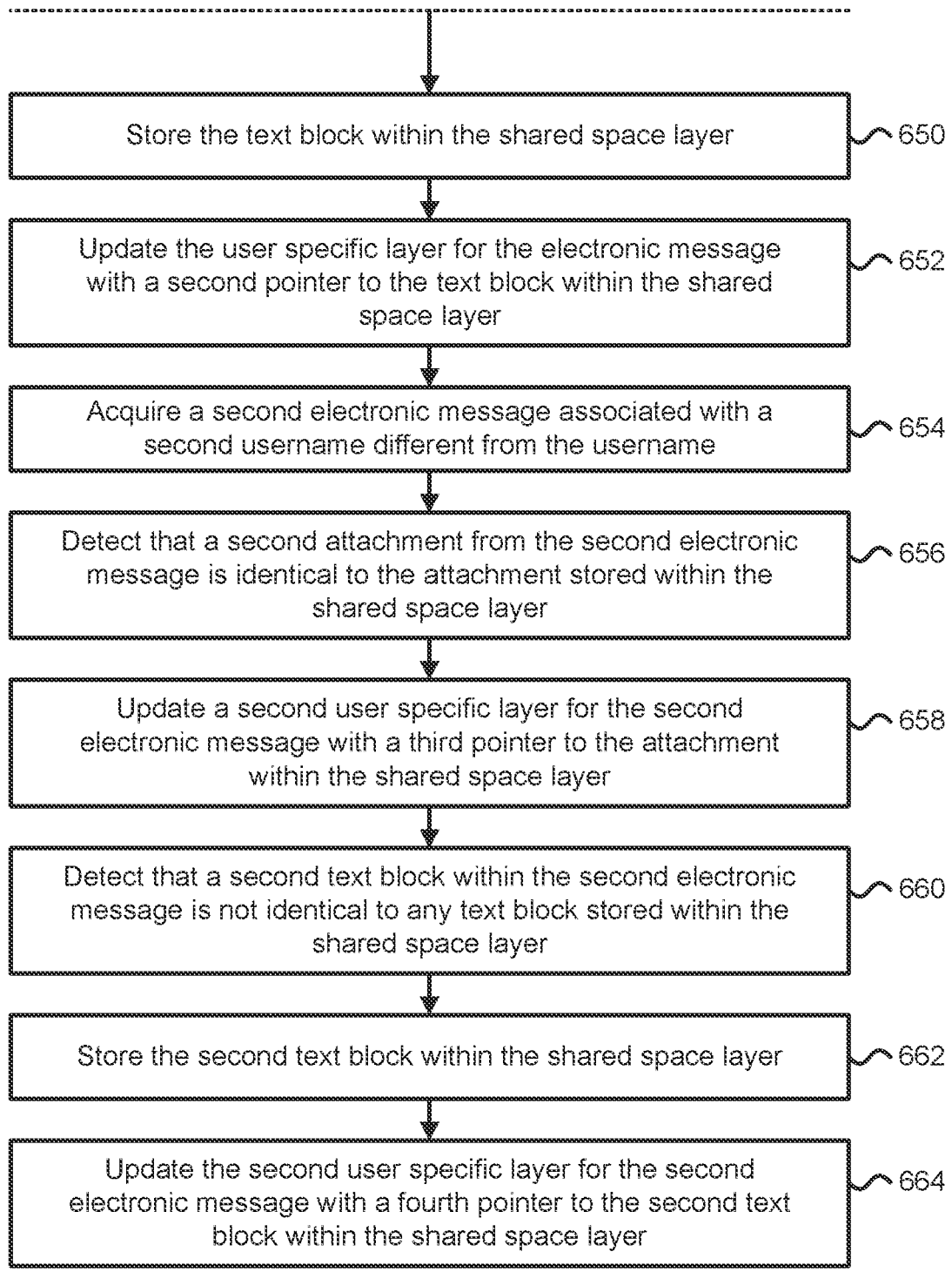

FIGS. 6E-6F depict a flowchart describing one embodiment of a process for deduplicating content using a shared space layer and one or more user specific layers that contain pointers into the shared space layer. In one embodiment, the process of FIGS. 6E-6F may be performed by a controller, such as the data backup and index generation controller 420 in FIG. 4B or by compute and storage resources, such as compute and storage resources 412 in FIG. 4B. In another embodiment, the process of FIGS. 6E-6F may be performed by a storage appliance, such as storage appliance 140 in FIG. 1A.

In step 632, an electronic message associated with a username is acquired. The electronic message may comprise one of a plurality of electronic messages received by an email address associated with the username. In some cases, the plurality of electronic messages may correspond with numerous email messages within a user's email mailbox at a particular point in time. In other cases, the plurality of electronic messages may correspond with numerous email messages across a plurality of email mailboxes for a plurality of different users at the particular point in time. In step 634, an attachment is identified from the electronic message. The attachment may comprise a text document, a word processing document, a spreadsheet, an image, or an audio file. In step 636, a text block is identified within the electronic message. The text block may comprise a paragraph within a body of electronic message or one or more words within the body of electronic message.

In step 638, an aggregate file size for the attachment is determined. In one example, the aggregate file size for the attachment may comprise the file size for the attachment. In another example, the aggregate file size for the attachment may comprise the file size for the attachment multiplied by the number of recipients of the electronic message. In this case, if the electronic message was sent to ten different email addresses, then the aggregate file size for the attachment may comprise ten times the file size for the attachment. In step 640, an aggregate data size for the text block is determined. In one example, the aggregate data size for the text block may comprise a file size for storing the text block or an amount of disk space required to store the text block. In another example, the aggregate data size for the text block may comprise the data size for storing the text block multiplied by the number of recipients of the electronic message. In this case, if electronic message was sent to twenty different email addresses, then the aggregate data size for the text block may comprise twenty times the data size for storing the text block.

In step 642, it is detected that the attachment should be stored within a shared space layer based on the aggregate file size for the attachment. In one example, if the aggregate file size for the attachment is greater than a threshold file size, then the attachment should be stored using the shared space layer. In step 644, it is detected that the text block should be stored within the shared space layer based on the aggregate data size for the text block. In one example, if the aggregate data size for the text block is greater than a threshold data size, then the text block should be stored using the shared space layer. In step 646, the attachment is stored within the shared space layer. The attachment may be stored using block storage or file-based storage. In step 648, a user specific layer is generated for the electronic message. The user specific layer for the electronic message may include a pointer to the attachment within the shared space layer. As the attachment has been stored within the shared space layer, it may be referenced by other user specific layers corresponding with other electronic messages.

In step 650, the text block is stored within the shared space layer. The text block may be stored using block storage or file-based storage. In step 652, the user specific layer for the electronic message is updated with a second pointer to the text block within the shared space layer. In this case, the user specific layer for the electronic message may comprise data from the originally received electronic message with a pointer to the attachment within the shared space layer and the second pointer to the text block within the shared space layer.

In step 654, a second electronic message associated with a second username different from the username is acquired. The second username may correspond with a second email address that is different from an email address associated with the username. In step 656, it is detected that a second attachment from the second electronic message is identical to the attachment stored within the shared space layer. It may be detected that the second attachment is identical to the attachment stored within the shared space layer by comparing one or more hash values generated from the second attachment and the attachment stored within the shared space layer. In step 658, a second user specific layer for the second electronic message is updated or created with a third pointer to the attachment within the shared space layer. In one embodiment, the electronic message may correspond with the user specific layer 612 in FIG. 6A with a pointer to the attachment 604 within the shared space layer 610 and the second electronic message may correspond with the user specific layer 614 in FIG. 6A with a second pointer to the attachment 604 within the shared space layer 610.

In step 660, it is detected that a second text block within the second electronic message is not identical to any text block stored within the shared space layer. In some cases, it may be detected that the second text block does not match any of the other text blocks stored within the shared space layer via direct data comparisons of the second text block with the other text blocks stored within shared space layer. In other cases, it may be detected that the second text block does not match any of the other text blocks stored within the shared space layer if one or more hash values generated from the second text block are not identical to corresponding hash values generated from any of the other text blocks stored within the shared space layer. In step 662, the second text block is stored within the shared space layer in response to detecting that the second text block within the second electronic message is not identical to any of the text blocks stored within the shared space layer. In step 664, the second user specific layer for the second electronic message is updated with a fourth pointer to the second text block within the shared space layer. The fourth pointer to the second text block may correspond with the pointer from the user specific layer 612 in FIG. 6A to the text block 602 within the shared space layer 610 of FIG. 6A.

Figure 6G:
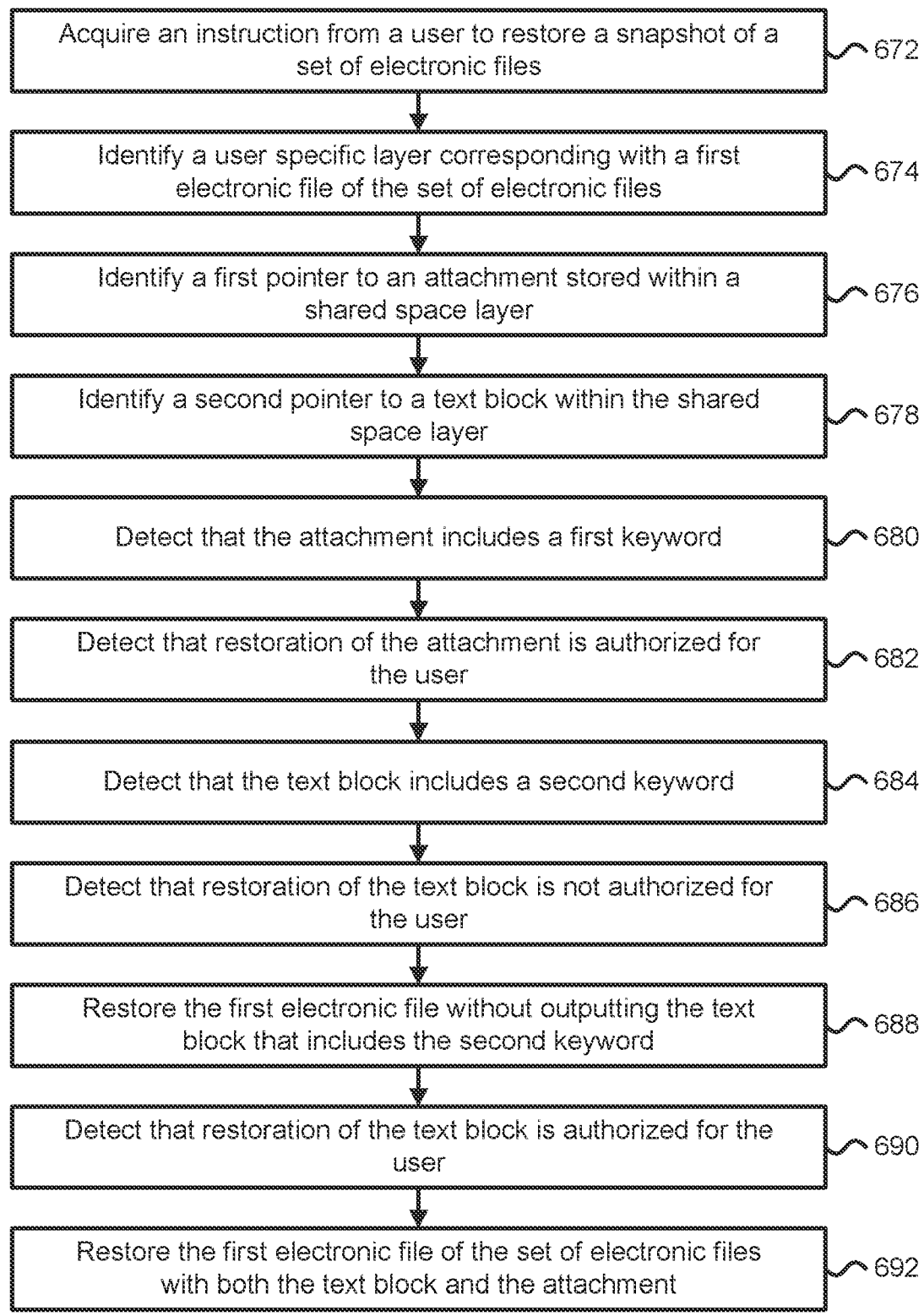
FIG. 6G is a flowchart describing one embodiment of a process for selectively restoring content from a shared space layer that is referenced by one or more user specific layers corresponding with individual electronic messages.

FIG. 6G is a flowchart describing one embodiment of a process for selectively restoring content from a shared space layer that is referenced by one or more user specific layers corresponding with individual electronic messages. In one embodiment, the process of FIG. 6G may be performed by a controller, such as the data backup and index generation controller 420 in FIG. 4B or by compute and storage resources, such as compute and storage resources 412 in FIG. 4B. In another embodiment, the process of FIG. 6G may be performed by a storage appliance, such as storage appliance 140 in FIG. 1A.

In step 672, an instruction from a user to restore a snapshot of a set of electronic files is acquired. The user may be identified via a username that is unique to the user. The set of electronic files may correspond with a plurality of electronic messages associated with a snapshot of an email mailbox associated with the username. In step 674, a user specific layer corresponding with a first electronic file of the set of electronic files is identified. The first electronic file may correspond with a first electronic message within the email mailbox. In step 676, a first pointer to an attachment stored within a shared space layer is identified. The first pointer to the attachment may be located within the user specific layer corresponding with the first electronic file. In step 678, a second pointer to a text block within the shared space layer is identified. The second pointer to the text block may be located within the user specific layer corresponding with the first electronic file. In one example, the user specific layer may correspond with the user specific layer 612 in FIG. 6C and the text block may correspond with the text block 602 within the shared space layer 610 of FIG. 6C.

In step 680, it is detected that the attachment includes a first keyword. The first keyword may be identified from a list of keywords associated with sensitive information that requires authorized access in order to view, access, search, or restore. The first keyword may comprise a project codename, an email address, a personal identification number, or a person's name. The list of keywords associated with the sensitive information may be stored in a lookup table that is periodically updated. The lookup table may be stored using storage resources, such as the resources 412 in FIG. 4B. In step 682, it is detected that restoration of the attachment is authorized for the user. In one example, the attachment may be authorized for the user because the attachment does not contain the first keyword. In another example, the attachment may be authorized for the user because the user is authorized to receive attachments that contain the first keyword. In step 684, it is detected that the text block includes a second keyword different from the first keyword. The second keyword may be identified from the list of keywords associated with the sensitive information.

In step 686, it is detected that restoration of the text block is not authorized for the user. In this case, it may be detected that restoration of the text block is not authorized for the user because the user is not authorized to receive content that includes the second keyword. In step 688, the first electronic file is restored without outputting the text block that includes the second keyword. In this case, as the user is not authorized to receive content that includes the second keyword, the second keyword may be omitted from the restored first electronic file. In some cases, the first electronic file may be restored with a different word substituted for the second keyword. An alert or message may be outputted to the user if a keyword substitution or omission has taken place during restoration of the first electronic file.

In step 690, it is detected that restoration of the text block is authorized for the user. Over time, the list of keywords associated with the sensitive information may be updated to not include the second keyword or the user may be authorized to receive content that includes the second keyword. In step 692, the first electronic file of the set of electronic files is restored with both the text block and the attachment. The restored first electronic file may be outputted from a storage appliance, such as storage appliance 140 in FIG. 1A, or outputted from a cloud-based storage service, such as customer cloud storage 404 in FIG. 4A.

Figure 7A:
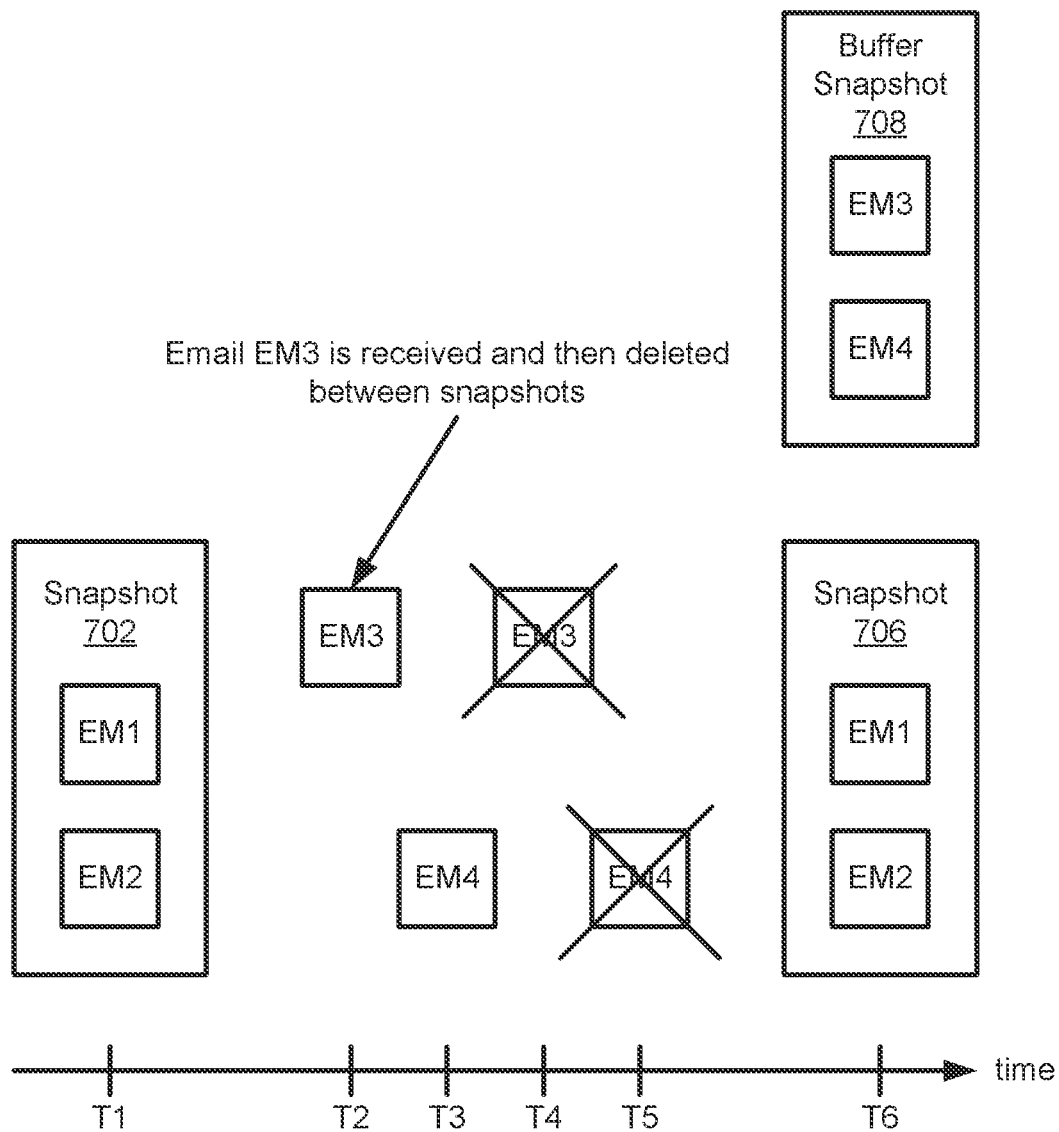
FIG. 7A depicts one embodiment of two consecutive snapshots of a set of electronic messages and electronic messages that were a part of the set of electronic files between the two consecutive snapshots but were not captured by the either of the two consecutive snapshots.

FIG. 7A depicts one embodiment of two consecutive snapshots of a set of electronic messages and electronic messages that were a part of the set of electronic messages between the two consecutive snapshots but were not captured by the either of the two consecutive snapshots. In one embodiment, the set of electronic messages may correspond with email messages within a user's email mailbox. The first user's email mailbox may include an inbox (e.g., for received electronic messages), a deleted items folder (e.g., for electronic messages that were deleted), a sent items folder (e.g., for electronic messages that were sent to others), and a drafts folder (e.g., for temporarily saved electronic messages that have not yet been sent to others). In another embodiment, the set of electronic messages may correspond with email messages across a plurality of email mailboxes (e.g., covering the email mailboxes of two thousand employees of a company). As depicted, a first snapshot 702 of the two consecutive snapshots includes two email messages EM1 and EM2. The first snapshot may comprise a state of the set of electronic messages at a first point in time T1. A second snapshot 706 of the two consecutive snapshots includes the two email messages EM1 and EM2. The second snapshot may comprise a state of the set of electronic messages at a second point in time T6 subsequent to the first point in time T1. In one example, the time difference between the first point in time and the second point in time may comprise 24 hours or may comprise one hour.

Modifications to metadata associated with the two email messages EM1 and EM2 may have been made subsequent to the first point in time (e.g., metadata associated with whether an email message has been read or a priority setting for the email message may have changed after the first point in time and prior to the second point in time). At time T2 that is subsequent to time T1 and prior to time T6, a third email message EM3 is received and stored within the set of electronic messages. Upon reception of the third email message EM3, the third email message EM3 may be stored within a buffer. In one example, the buffer may comprise a memory buffer within a storage resource, such as compute and storage resources 412 in FIG. 4B. In another example, the buffer may comprise a memory, such as memory 177 in FIG. 1A.

In some embodiments, inbound email messages and outbound email messages may be intercepted by a server that may forward the email messages or store the email messages in the buffer. The third email message EM3 may be added to an inbox of the user's email mailbox. At time T4 that is prior to time T6, the third email message EM3 is deleted from the set of electronic messages (e.g., due to the third email message EM3 being deleted from the inbox). At time T3 that is prior to time T6, a fourth email message EM4 is sent from the user's email mailbox and may be stored within a sent items folder of the user's email mailbox. Upon transmission of the fourth email message EM4, the fourth email message EM4 may be stored within the same buffer that is used for temporarily storing the third email message EM3. At time T5 that is prior to time T6, the fourth email message EM4 is deleted from the user's email mailbox or is deleted from the sent items folder of the user's email mailbox. As the email messages EM3 and EM4 were received and transmitted subsequent to the first point in time corresponding with the first snapshot 702 and then were deleted prior to the second point in time corresponding with the second snapshot 706, neither the first snapshot 702 nor the second snapshot 706 includes the email messages EM3 and EM4.

When the second snapshot 706 is captured and stored, the buffered electronic messages stored within the buffer for temporarily storing electronic messages that were transmitted and received subsequent to the first point in time may be compared with the electronic messages stored within the second snapshot 706. If a buffered electronic message is not stored within the second snapshot 706, then the buffered electronic message may be identified as an electronic message that was received or transferred subsequent to the first snapshot 702 and was deleted prior to the second snapshot 706. As both the third email message EM3 and the fourth email message EM4 were buffered but did not appear within the second snapshot 706, the email messages EM3 and EM4 may be stored within a buffer snapshot 708. The buffer snapshot 708 may store a record of the electronic messages that were received or transferred from a user's email mailbox but were not captured within the two consecutive snapshots 702 and 706 of the set of electronic messages.

In one embodiment, the set of electronic messages may include a first set of email messages associated with a first user's email mailbox and a second set of email messages associated with a second user's email mailbox. The third email message EM3 may comprise an electronic message that was received at the first user's email mailbox and the fourth email message EM4 may comprise an electronic message that was transferred or sent from the second user's email mailbox. After the buffer snapshot 708 has been generated and stored, the contents of the buffer may be flushed and used to accumulate electronic messages that are received and transferred subsequent to the second point in time.

In one embodiment, a list of emails that were received and/or sent from a user's email mailbox subsequent to a first snapshot of the user's email mailbox may be compared with a list of emails that were captured by a second snapshot of the user's email mailbox in order to identify email messages that were not included within either the first snapshot of the user's email mailbox or the second snapshot of the user's email mailbox. In another embodiment, the contents of the buffer snapshot 708 may be searched for restricted keywords associated with sensitive information. The restricted keywords may be stored within a table or a list of restricted keywords. Upon detection that the contents of the buffer snapshot 708 include a restricted keyword associated with the sensitive information, an alert may be generated and outputted identifying the electronic message within the buffer snapshot 708 that includes the restricted keyword.

In another embodiment, an electronic message stored within the buffer may be deleted and not captured within the buffer snapshot 708 if the electronic message is less than a threshold data size (e.g., is less than 5 MB). In another embodiment, an electronic message within the buffer may be deleted and not captured within the buffer snapshot 708 if the electronic message includes a restricted keyword. In some embodiments, an electronic message within the buffer may be captured and stored within the buffer snapshot 708 only if the electronic message includes a restricted keyword. In this case, an electronic message within the buffer may be preserved within the buffer snapshot 708 only if the electronic message includes one or more restricted keywords. In another embodiment, an electronic message within the buffer may be captured and stored within the buffer snapshot 708 only if the electronic message includes a keyword that has been searched within a threshold period of time (e.g., an electronic message may be preserved if electronic message includes a keyword that is been searched within the past week).

Figure 7B:
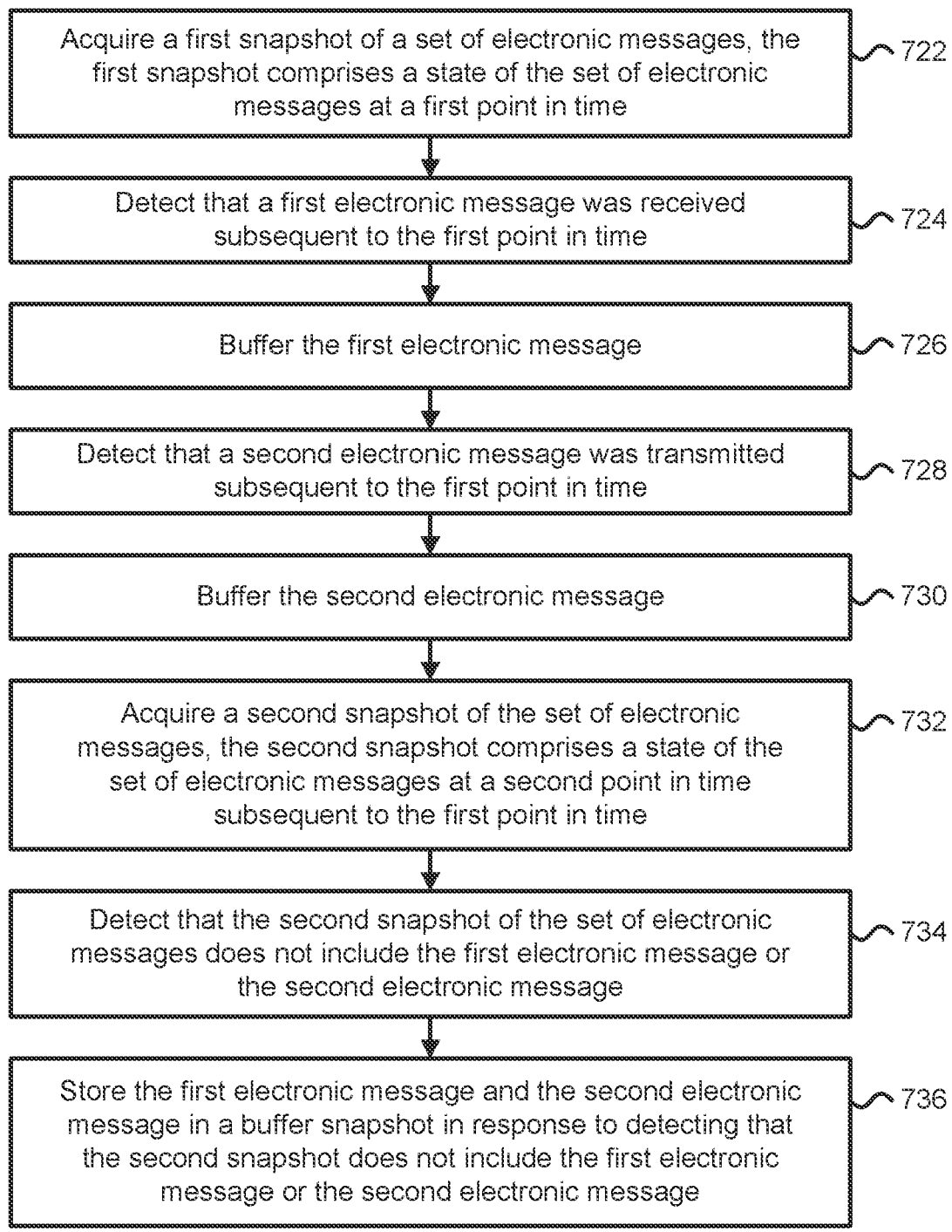
FIG. 7B is a flowchart describing one embodiment of a process for identifying electronic messages that were not captured by two consecutive snapshots of a set of electronic messages and generating a buffer snapshot for the missing electronic messages.

FIG. 7B is a flowchart describing one embodiment of a process for identifying electronic messages that were not captured by two consecutive snapshots of a set of electronic messages and generating a buffer snapshot for the missing electronic messages. The set of electronic messages may correspond with email messages within a user's email mailbox. In one embodiment, the process of FIG. 7B may be performed by a controller, such as the data backup and index generation controller 420 in FIG. 4B or by compute and storage resources, such as compute and storage resources 412 in FIG. 4B. In another embodiment, the process of FIG. 7B may be performed by a storage appliance, such as storage appliance 140 in FIG. 1A.

In step 722, a first snapshot of a set of electronic messages is acquired. The first snapshot may comprise a state of the set of electronic messages at a first point in time. The set of electronic messages may correspond with email messages within one or more email mailboxes. In step 724, it is detected that a first electronic message was received subsequent to the first point in time. In step 726, the first electronic message is buffered within a memory buffer. The memory buffer may reside within a server that is configured to intercept electronic messages that are received or transmitted from the one or more email mailboxes. In step 728, it is detected that a second electronic message was transmitted subsequent to the first point in time. In step 730, the second electronic message is buffered within the memory buffer. In step 732, a second snapshot of the set of electronic messages is acquired. The second snapshot may comprise a state of the set of electronic messages at a second point in time subsequent to the first point in time. The first snapshot and the second snapshot may comprise two consecutive snapshots of the set of electronic messages. In step 734, it is detected that the second snapshot of the set of electronic messages does not include either the first electronic message or the second electronic message. In step 736, the first electronic message and the second electronic message are stored in a buffer snapshot in response to detecting that the second snapshot does not include either the first electronic message or the second electronic message. In some embodiments, the first electronic message may only be stored within the buffer snapshot if the first electronic message includes a restricted keyword, was sent from a particular email address, or was involved in a keyword search prior to the second point in time.

One embodiment of the disclosed technology includes establishing a secure connection with a cloud-based storage account, identifying compute and storage resources that are available within the cloud-based storage account, detecting that a first snapshot of a set of data should be captured and stored within the cloud-based storage account, directing the cloud-based storage account to acquire a first set of data associated with the first snapshot from a cloud-based service, directing the cloud-based storage account to store the first snapshot using the compute and storage resources, determining a first file size for a first search index for the first snapshot based on an amount of available disk space within the compute and storage resources, and directing the cloud-based storage account to generate and store the first search index for the first snapshot using the compute and storage resources such that the file size of the first search index is not greater than the first file size.

One embodiment of the disclosed technology includes acquiring an instruction from a user to restore a snapshot of a set of electronic files, acquiring a user specific layer corresponding with a first electronic file of the set of electronic files, identifying a first pointer to an attachment stored within a shared space layer using the user specific layer for the first electronic file, identifying a second pointer to a text block stored within the shared space layer using the user specific layer for the first electronic file, detecting that restoration of the attachment is authorized for the user, detecting that the text block includes a restricted keyword, detecting that restoration of the text block is not authorized for the user subsequent to detecting that the text block includes the restricted keyword, and restoring the first electronic file with the attachment and without outputting the restricted keyword.

The disclosed technology may be described in the context of computer-executable instructions, such as software or program modules, being executed by a computer or processor. The computer-executable instructions may comprise portions of computer program code, routines, programs, objects, software components, data structures, or other types of computer-related structures that may be used to perform processes using a computer. In some cases, hardware or combinations of hardware and software may be substituted for software or used in place of software.

Computer program code used for implementing various operations or aspects of the disclosed technology may be developed using one or more programming languages, including an object oriented programming language such as Java or C++, a function programming language such as Scala, a procedural programming language such as the "C" programming language or Visual Basic, or a dynamic programming language such as Python or JavaScript. In some cases, computer program code or machine-level instructions derived from the computer program code may execute entirely on an end user's computer, partly on an end user's computer, partly on an end user's computer and partly on a remote computer, or entirely on a remote computer or server.

For purposes of this document, it should be noted that the dimensions of the various features depicted in the Figures may not necessarily be drawn to scale.

For purposes of this document, reference in the specification to "an embodiment," "one embodiment," "some embodiments," or "another embodiment" may be used to describe different embodiments and do not necessarily refer to the same embodiment.

For purposes of this document, a connection may be a direct connection or an indirect connection (e.g., via another part). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed by a data management system, the method comprising:
   acquiring a first electronic message;

storing a portion of the first electronic message within a shared space layer;

storing, within a first user specific layer for the first electronic message, a first pointer to the portion of the first electronic message within the shared space layer;

acquiring a second electronic message, wherein a portion of the second electronic message is identical to the portion of the first electronic message; and storing, within a second user specific layer for the second electronic message, a second pointer to the portion of the first electronic message within the shared space layer based at least in part on the portion of the second electronic message being identical to the portion of the first electronic message.

2. The method of claim 1, further comprising:

determining a quantity of recipients of the first electronic message; and determining an aggregate file size for storing the portion of the first electronic message based at least in part on the quantity of recipients of the first electronic message.

3. The method of claim 2, further comprising:

determining to store the portion of the first electronic message within the shared space layer based at least in part on the aggregate file size for the portion of the first electronic message.

4. The method of claim 2, wherein the portion of the first electronic message comprises an attachment associated with the first electronic message, and wherein the aggregate file size for the portion of the first electronic message is based at least in part on a file size of the attachment.

5. The method of claim 1, further comprising:

determining an aggregate file size for storing a text block within the first electronic message;

determining that the text block should be stored within the shared space layer based at least in part on the aggregate file size for the text block;

storing the text block within the shared space layer based at least in part on determining that the text block should be stored within the shared space layer; and storing, within the shared space layer, a third pointer to the text block.

6. The method of claim 1, further comprising:

determining that a second text block within the second electronic message is not identical to any text block stored within the shared space layer;

determining that the second text block should be stored within the shared space layer based at least in part on the second text block being not identical to any text block stored within the shared space layer;

storing the second text block within the shared space layer based at least in part on determining that the second text block should be stored within the shared space layer; and storing, within the shared space layer, a fourth pointer to the second text block.

7. The method of claim 6, further comprising:

determining that the second electronic message was sent to at least a threshold quantity of email addresses, wherein determining that the second text block should be stored within the shared space layer is further based at least in part on the second electronic message being sent to at least the threshold quantity of email addresses.

8. The method of claim 1, wherein the portion of the first electronic message and the portion of the second electronic message comprise an attachment or text block that is common to both the first electronic message and the second electronic message.

9. The method of claim 8, wherein the first electronic message corresponding to the first user specific layer and the second electronic message corresponding to the second user specific layer are from a same email mailbox.

10. The method of claim 1, wherein the first electronic message corresponding to the first user specific layer is from a first email mailbox and the second electronic message corresponding to the second user specific layer is from a second email mailbox.

11. A data management system, comprising:

memory; and one or more processors coupled with the memory, the one or more processors configured to cause the data management system to:

acquire a first electronic message;

store a portion of the first electronic message within a shared space layer;

store, within a first user specific layer for the first electronic message, a first pointer to the portion of the first electronic message within the shared space layer;

acquire a second electronic message, wherein a portion of the second electronic message is identical to the portion of the first electronic message; and store, within a second user specific layer for the second electronic message, a second pointer to the portion of the first electronic message within the shared space layer based at least in part on the portion of the second electronic message being identical to the portion of the first electronic message.

12. The data management system of claim 11, wherein the one or more processors are further configured to cause the data management system to:

determine a quantity of recipients of the first electronic message; and determine an aggregate file size for storing the portion of the first electronic message based at least in part on the quantity of recipients of the first electronic message.

13. The data management system of claim 12, wherein the one or more processors are further configured to cause the data management system to:

determine to store the portion of the first electronic message within the shared space layer based at least in part on the aggregate file size for the portion of the first electronic message.

14. The data management system of claim 12, wherein the portion of the first electronic message comprises an attachment associated with the first electronic message, and wherein the aggregate file size for the portion of the first electronic message is based at least in part on a file size of the attachment.

15. The data management system of claim 11, wherein the one or more processors are further configured to cause the data management system to:

determine an aggregate file size for storing a text block within the first electronic message;

determine that the text block should be stored within the shared space layer based at least in part on the aggregate file size for the text block;

store the text block within the shared space layer based at least in part on determining that the text block should be stored within the shared space layer; and store, within the shared space layer, a third pointer to the text block.

16. The data management system of claim 11, wherein the one or more processors are further configured to cause the data management system to:
- determine that a second text block within the second electronic message is not identical to any text block stored within the shared space layer;
- determine that the second text block should be stored within the shared space layer based at least in part on the second text block being not identical to any text block stored within the shared space layer;
- store the second text block within the shared space layer based at least in part on determining that the second text block should be stored within the shared space layer; and
- store, within the shared space layer, a fourth pointer to the second text block.

17. The data management system of claim 16, wherein the one or more processors are further configured to cause the data management system to:
- determine that the second electronic message was sent to at least a threshold quantity of email addresses, wherein determining that the second text block should be stored within the shared space layer is further based at least in part on the second electronic message being sent to at least the threshold quantity of email addresses.

18. The data management system of claim 11, wherein the portion of the first electronic message and the portion of the second electronic message comprise an attachment or text block that is common to both the first electronic message and the second electronic message.

19. A non-transitory, computer-readable medium storing code comprising instructions executable by one or more processors of an electronic system to cause the electronic system to:
- acquire a first electronic message;
- store a portion of the first electronic message within a shared space layer;
- store, within a first user specific layer for the first electronic message, a first pointer to the portion of the first electronic message within the shared space layer;
- acquire a second electronic message, wherein a portion of the second electronic message is identical to the portion of the first electronic message; and
- store, within a second user specific layer for the second electronic message, a second pointer to the portion of the first electronic message within the shared space layer based at least in part on the portion of the second electronic message being identical to the portion of the first electronic message.

20. The computer-readable medium of claim 19, wherein the portion of the first electronic message and the portion of the second electronic message comprise an attachment or text block that is common to both the first electronic message and the second electronic message.

* * * * *